United States Patent
Tanaka et al.

(10) Patent No.: US 6,863,150 B1
(45) Date of Patent: Mar. 8, 2005

(54) ELECTRIC POWER STEERING CONTROL APPARATUS

(75) Inventors: Hideyuki Tanaka, Tokyo (JP); Masahiko Kurishige, Tokyo (JP); Noriyuki Inoue, Tokyo (JP); Kazumichi Tsutsumi, Tokyo (JP); Shigeki Ohtagaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/669,654

(22) Filed: Sep. 25, 2003

(51) Int. Cl.[7] .................................................. B62D 5/06
(52) U.S. Cl. ......................... 180/446; 180/443; 701/41
(58) Field of Search ................................ 180/446, 443, 180/402

(56) References Cited

U.S. PATENT DOCUMENTS

| | | | |
|---|---|---|---|
| 4,715,463 A | 12/1987 | Shimizu | |
| 5,568,389 A | * 10/1996 | McLaughlin et al. | 701/41 |
| 6,450,287 B1 | * 9/2002 | Kurishige et al. | 180/446 |
| 6,768,283 B2 | * 7/2004 | Tanaka et al. | 318/632 |
| 2002/0125063 A1 | 9/2002 | Kurishige et al. | |

FOREIGN PATENT DOCUMENTS

| | | |
|---|---|---|
| DE | 4300365 A1 | 7/1993 |
| EP | 1129926 A1 | 9/2001 |
| EP | 1184254 A2 | 3/2002 |
| EP | 1236638 A1 | 9/2002 |
| JP | 2001-122146 A | 5/2001 |
| JP | 2001-239951 A | 9/2001 |
| JP | 2003-312521 | 11/2003 |

OTHER PUBLICATIONS

French Preliminary Search Report dated Jun. 10, 2004.

* cited by examiner

Primary Examiner—Lesley D. Morris
Assistant Examiner—Tony Winner
(74) Attorney, Agent, or Firm—Sughrue Mion, PLLC

(57) ABSTRACT

A road surface reaction torque detector has a low-pass filter element whose time constant is determined in accordance with a vehicle speed that is detected by a vehicle steed detector and a motor rotation speed that is detected by a motor rotation speed detector. A road surface reaction torque estimation value is obtained in such a manner that the road surface reaction torque detector performs low-pass filter processing on steering shaft reaction torque signal that is outputted by a steering shaft reaction torque signal outputting means. As a result, an accuracy of estimation of road surface reaction torque is improved.

12 Claims, 16 Drawing Sheets

ELECTRIC POWER STEERING CONTROL APPARATUS

BACKGROUND OF THE INVENTION

1. Field of the Invention

The present invention relates to an electric power steering control apparatus for controlling an electric motor device that generates assist torque for assisting steering torque of an automobile driver.

2. Description of the Related Art

Among conventional electric power steering control apparatus is one disclosed in JP-A-2001-239951 in which one or more stages of first-order low-pass filters are formed to estimate road surface reaction torque and the time constants of the low-pass filters are arranged in accordance with the steering speed. JP-A-2001-122146 discloses an electric power steering control apparatus in which the time constant of a low-pass filter is arranged in accordance with the vehicle speed.

However, the conventional technique of arranging the time constants of the low-pass filters in accordance with only the steering speed has a problem that the accuracy of estimation of road surface reaction torque is lowered as the vehicle speed increases. The technique of arranging the time constant of the low-pass filter in accordance with only the vehicle speed has a problem that the accuracy of estimation of road surface reaction torque is lowered as the steering speed increases. No technique has been proposed that determines the time constant of a low-pass filter in accordance with both of the vehicle speed and the steering speed or the rotation speed of the electric motor device that generates assist torque.

SUMMARY OF THE INVENTION

The present invention has been made to solve the above problems, and an object of the invention is therefore to provide an electric power steering control apparatus capable of increasing the accuracy of estimation of road surface reaction torque by determining the time constant of a low-pass filter using both of the vehicle speed and the rotation speed of an electric motor device that generates assist torque.

The invention provides an electric power steering control apparatus having an electric motor device that applies assist torque for assisting steering torque of a driver to a steering shaft that is coupled to an axle of a vehicle. The electric power steering control apparatus includes vehicle speed detecting means, motor speed detecting means, steering shaft reaction torque signal outputting means and road surface reaction torque detecting means. The vehicle speed detecting means detects a vehicle speed. The motor speed detecting means detects a rotation speed of the electric motor device. The steering shaft reaction torque signal outputting means outputs a steering shaft reaction torque signal that corresponds to steering shaft reaction torque acting on the steering shaft. The road surface reaction torque detecting means generates a road surface reaction torque estimation value to be used for a control on the assist torque by filtering the steering shaft reaction torque signal by a low-pass filter operation. And a time constant of the low-pass filter operation is determined in accordance with the vehicle speed detected by the vehicle speed detecting means and the motor rotation speed detected by the motor speed detecting means.

In the electric power steering control apparatus according to the invention, road surface reaction torque can be estimated even if the rotation speed of the electric motor device that produces assist torque varies or the vehicle speed varies and an electric power steering control that responds to such a variation can be realized.

DESCRIPTION OF THE PREFERRED EMBODIMENTS

Embodiment 1

Figure 1:
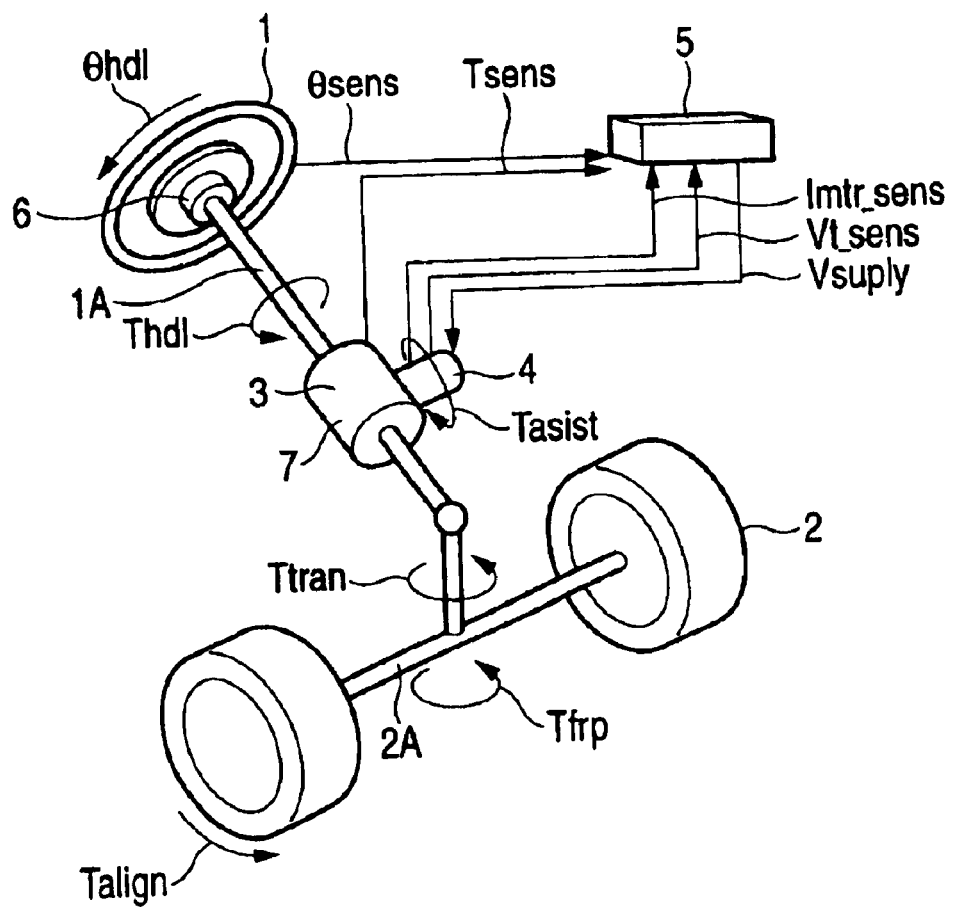
FIG. 1 shows the configuration of an electric power steering control apparatus according to a first embodiment of the present invention.

FIG. 1 is a schematic diagram showing an electric power steering control apparatus according to a first embodiment of the present invention.

In FIG. 1, reference numeral 1 denotes a steering wheel of an automobile that is manipulated by a driver. The steering wheel 1 is coupled to a steering shaft 1A. Reference numeral 2 denotes tires that are attached to both ends of an axle 2A of the automobile. The steering shaft 1A is coupled to the axle 2A so as to steer it. Reference numeral 3 denotes a torque sensor that is provided in a steering torque transmission mechanism from the steering wheel 1 to the tires 2, for example, attached to the steering shaft 1A. The torque sensor 3 detects a steering torque that is generated by a steering manipulation of the driver. Reference numeral 4 denotes an EPS (electric power steering) motor that is provided in the steering torque transmission mechanism from the steering wheel 1 to the tires 2, for example, attached to the steering shaft 1A so as to apply assist torque to it. The EPS motor 4 generates assist torque for assisting steering torque of the driver. Reference numeral 5 denotes an EPS electronic control unit (hereinafter abbreviated as EPS-ECU) for controlling the EPS motor 4. Reference numeral 6 denotes a steering angle sensor that is provided so as to detect an angle of a steering manipulation of the driver on the steering wheel 1. The steering angle sensor 6 detects a steering angle with respect to a neutral position of the steering wheel 1. Reference numeral 7 denotes reduction gears provided between the EPS motor 4 and the steering shaft 1A. The EPS motor 4 reduction-drives the steering shaft 1A via the reduction gears 7.

Symbol θhdl represents a steering angle of the steering wheel 1; θsens, a steering angle detection signal that is output from the steering angle sensor 6; Tsens, a steering torque detection signal that is outputted from the torque sensor 3; Imtr_sens, a drive current detection signal of the EPS motor 4; Vt_sens, a drive voltage detection signal of the EPS motor 4; Vsupply, a supply voltage of the EPS motor 4; Tassist, assist torque that the EPS motor 4 applies to the steering shaft 1A; Thdl, steering torque that the driver applies to the steering wheel 1; Ttran, steering shaft reaction torque that is exerted on the steering shaft 1A from the tires 2; Tfrp, friction torque in a steering route from the steering shaft 1A to the axle 2A; and Talign, road surface reaction torque that is received from the tires 2.

Figure 2:
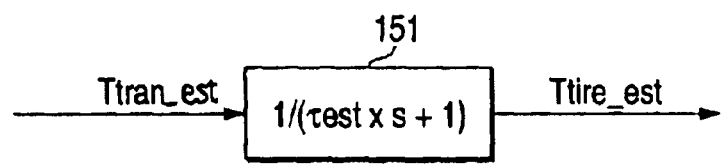
FIG. 2 shows the principle of calculation for estimating road surface reaction torque in the electric power steering control apparatus according to the first embodiment of the invention.

FIG. 2 is a diagram showing the principle of calculation for estimating road surface reaction torque in the electric power steering control apparatus according to the first embodiment of the invention. The diagram includes a low-pass filter element 151. A microprocessor in the EPC-ECU 5 serves as the low-pass filter element 151 to perform signal processing for generating a signal that would be obtained by inputting an input signal to an actual low-pass filter; it is not necessary to use a hardware low-pass filter.

In FIG. 2, symbol Ttire_est represents an estimation value of road surface reaction torque, τest is a time constant of the low-pass filter element 151, and s is a Laplace transform variable. The low-pass filter element 151 receives the steering shaft reaction torque signal Ttran_sens and outputs the road surface reaction torque estimation value Ttire_est by multiplying the steering shaft reaction torque signal Ttran-sens by $1/(\tau est \times s + 1)$.

Figure 3:
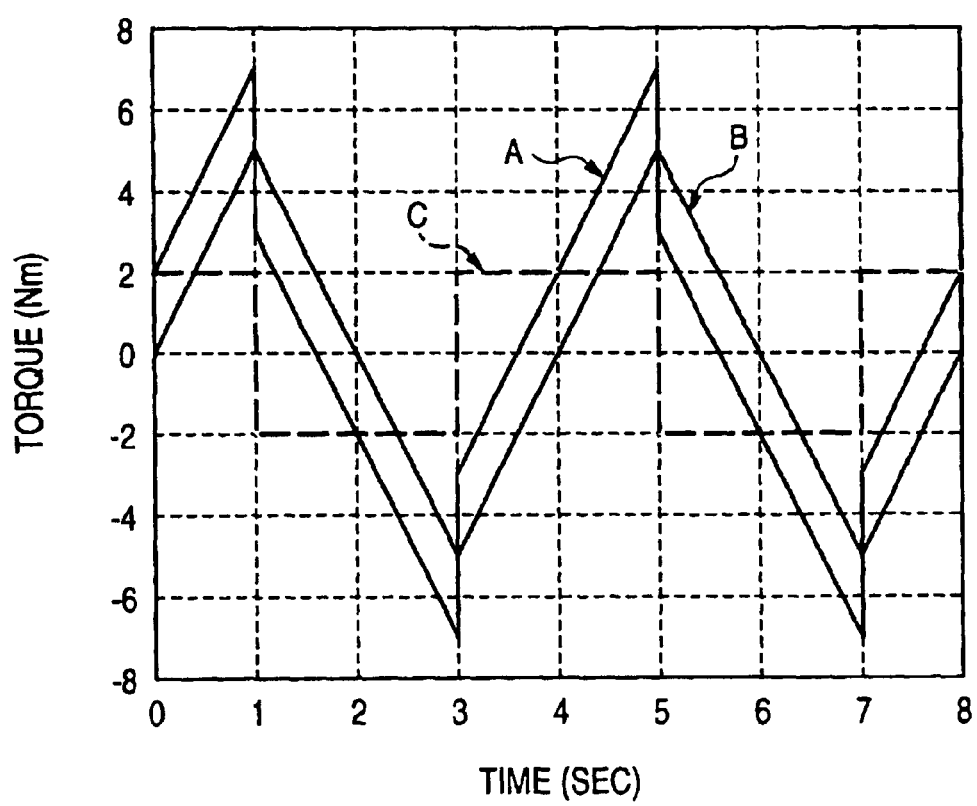
FIG. 3 is a characteristic diagram showing road surface reaction torque and friction torque in the electric power steering control apparatus according to the first embodiment of the invention.

FIG. 3 is a characteristic diagram showing temporal variations of torque in the electric power steering control apparatus according to the first embodiment of the invention.

In FIG. 3, the vertical axis represents the torque (N·m) and the horizontal axis represents the time(s). Characteristic A shows a variation of the steering shaft reaction torque Ttran, characteristic B shows a variation of the road surface reaction torque estimation value Ttire_est, and characteristic C shows a variation of the friction torque Tfrp. The characteristic A is the sum of the characteristic B and the characteristic C.

Figure 4:
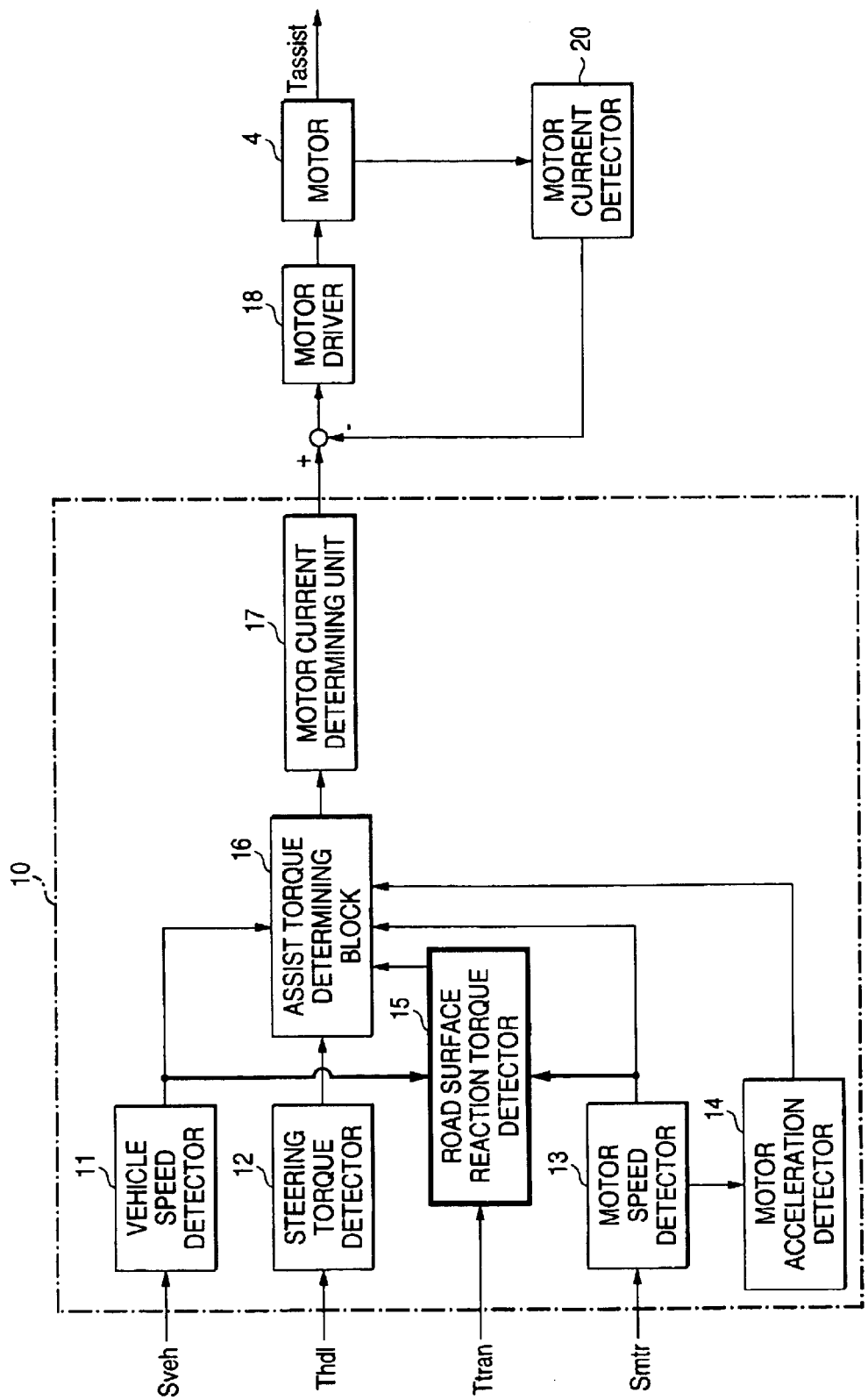
FIG. 4 is a block diagram of the electric power steering control apparatus according to the first embodiment of the invention.

FIG. 4 is a block diagram showing the configuration of the electric power steering control apparatus according to the first embodiment of the invention. In FIG. 4, reference numeral 10 denotes a calculation block for calculating a target value of the drive current Imtr of the motor 4.

In FIG. 4, reference numeral 11 denotes a vehicle speed detector (i.e., vehicle speed detecting means) for detecting a vehicle speed Sveh of the automobile and generates a vehicle speed signal sveh_sens. Reference numeral 12 denotes a steering torque detector (i.e., steering torque detecting means) for detecting, as a steering torque detection signal Tsens, steering torque Thdl that is applied to the steering wheel 1. Reference numeral 13 denotes a motor speed detector (i.e., motor speed detecting means) for detecting, as a rotation speed detection signal Smtr_sens, a rotation speed Smtr of the EPS motor 4. Reference numeral 14 denotes a motor acceleration detector (i.e., motor acceleration detecting means) for detecting, as a rotation acceleration signal Amtr_sens, a rotation acceleration (or deceleration) Amtr of the motor 4. Reference numeral 15 denotes a road surface reaction torque detector (i.e., road surface reaction torque detecting means). The road surface reaction torque detector 15 receives a steering shaft reaction torque Ttran and outputs road surface reaction torque estimation value Ttire_est using the vehicle speed signal Sveh_sens and the motor rotation speed detection signal Smtr_sens that are outputted from the vehicle speed detector 11 and the motor speed detector 13, respectively. Reference numeral 16 denotes an assist torque determining block that determines assist torque Tassist for assisting the steering torque Thdl on the basis of the vehicle speed signal Sveh_sens from the vehicle speed detector 11, the steering torque detection signal Tsens from the steering torque detector 12, the motor rotation speed detection signal Smtr_sens from the motor speed detector 13, the motor rotation acceleration detection signal Amtr_sens from the motor acceleration detector 14, and the road surface reaction torque estimation value Ttire_est from the road surface reaction torque detector 15. Reference numeral 17 denotes a motor current determining unit for determining a target value of the drive current Imtr of the EPS motor 4 on the basis of the assist torque value Tassist as the output of the assist torque determining block 16. Reference numeral 18 denotes a motor driver for driving the EPS motor 4. Reference numeral 20 denotes a motor current detector for detecting a drive current Imtr of the EPS motor 4 and outputs a motor current detection signal Imtr_sens. The motor driver 18 drives the EPS motor 4 so that the motor current detection signal Imtr_sens that is detected by the motor current detector 20 becomes equal to the target value of the drive current Imtr that is supplied from the motor current determining unit 17. The EPS motor 4 generates assist torque Tassist.

Figure 5:
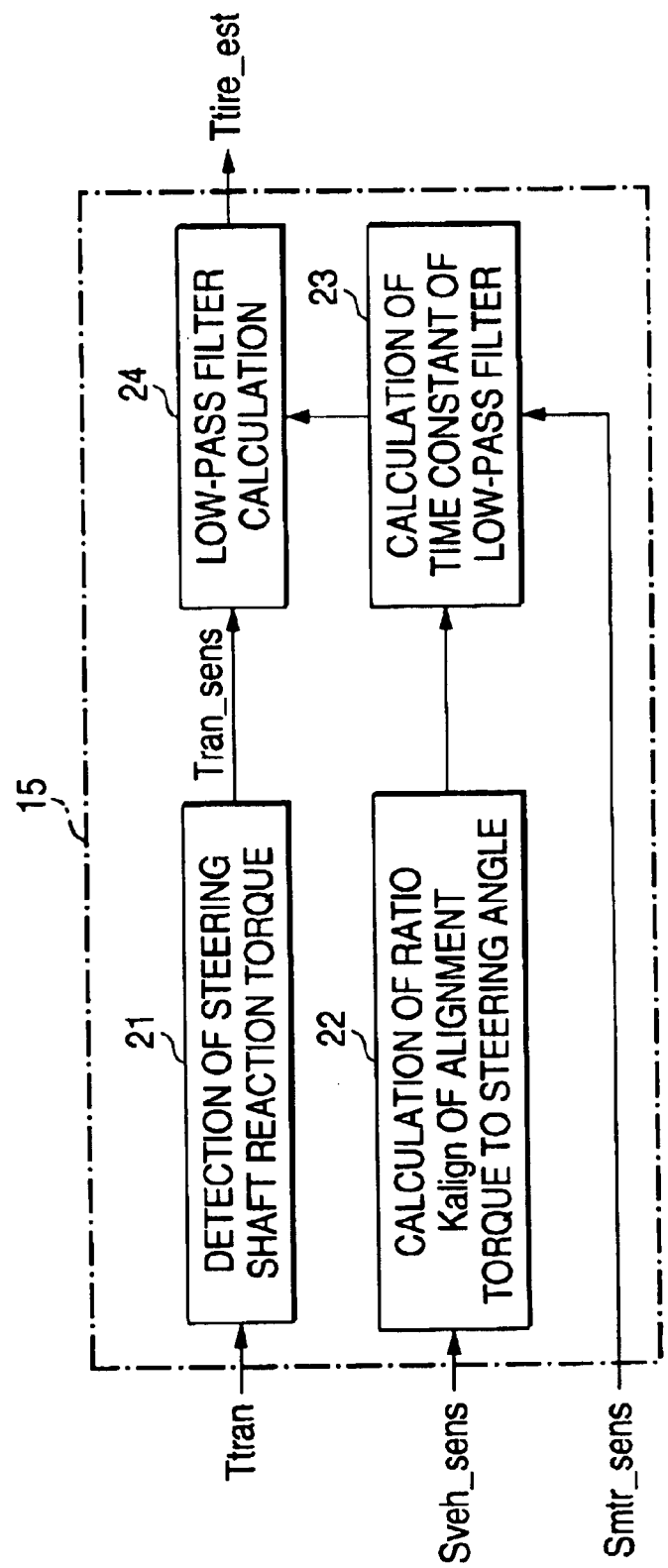
FIG. 5 is a functional block diagram of a road surface reaction torque detector of the electric power steering control apparatus according to the first embodiment of the invention.

FIG. 5 is a functional block diagram showing a specific configuration of the road surface reaction torque detector 15 of the electric power steering control apparatus according to the first embodiment of the invention. The block enclosed by a dot-dashed lines is the road surface reaction torque detector 15.

In FIG. 5, reference numeral 21 denotes a steering shaft reaction torque Ttran detection block for generating a steering shaft reaction torque signal Ttran_sens on the basis of the steering shaft reaction torque Ttran. Reference numeral 22 denotes a ratio Kalign calculation block for calculating a ratio Kalign of road surface reaction torque (i.e., alignment torque) Talign to steering angle θhdl on the basis of a vehicle speed signal Sveh_sens that is supplied from the vehicle speed detector 11. Reference numeral 23 denotes a time constant calculation block for calculating a time constant of the low-pass filter element 151 on the basis of the ratio Kalign and a, motor rotation speed signal Smtr_sens that are supplied from the calculation block 22 and the motor speed detector 13, respectively. Reference numeral 24 denotes a low-pass filter calculation block for calculating and outputs a road surface reaction torque estimation value Ttire_est on the basis of the steering shaft reaction torque signal Ttran_sens supplied from the detection block 21 and the output of the time constant calculation block 23.

Figure 6:
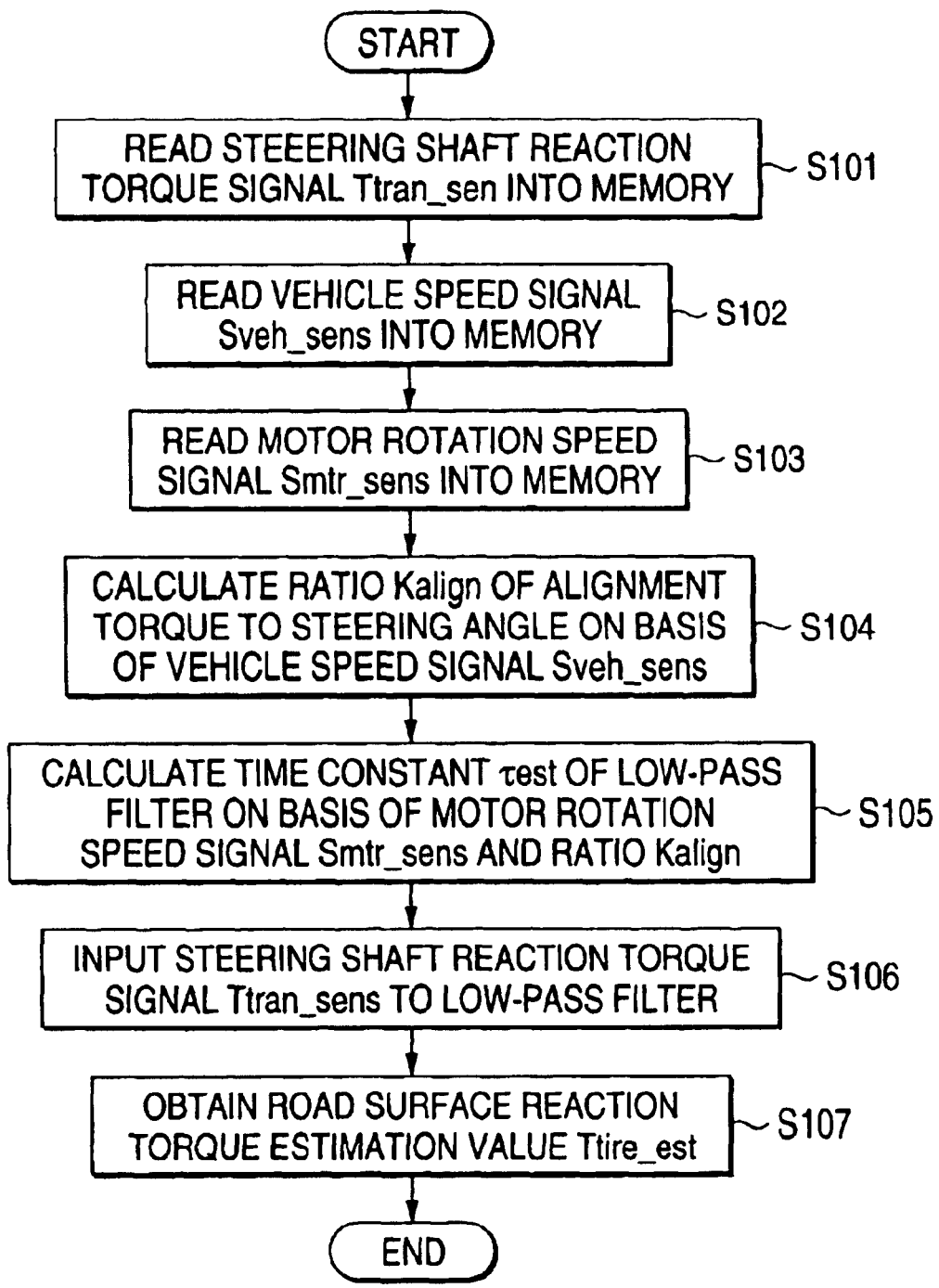
FIG. 6 is a flowchart of a process that is executed by the road surface reaction torque detector of the electric power steering control apparatus according to the first embodiment of the invention.

FIG. 6 is a flowchart of a process that is executed by the road surface reaction torque detector 15 of the electric power steering control apparatus according to the first embodiment of the invention. This flowchart includes seven steps, that is, steps S101–S107 (described later), between the start and the end.

Figure 7:
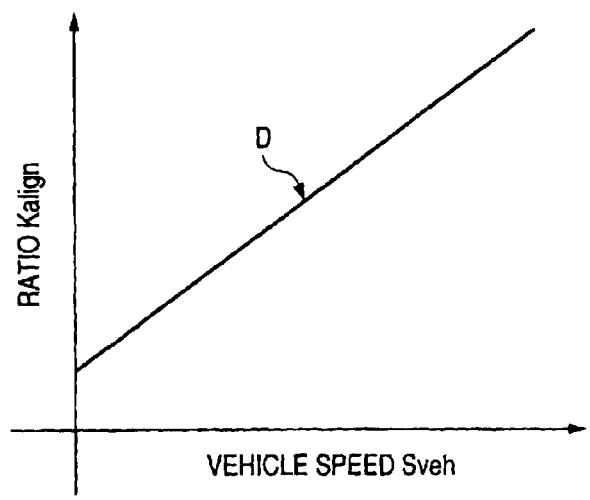
FIG. 7 is a characteristic diagram showing a relationship between the vehicle speed and the ratio (alignment torque)/(steering angle) in the electric power steering control apparatus according to the first embodiment of the invention.

FIG. 7 is a characteristic diagram of characteristic D that is a relationship between the vehicle speed Sveh of the automobile and the ratio Kalign, that is, (road surface reaction torque (alignment torque) Talign)/(steering angle θhdl) in the electric power steering control apparatus according to the first embodiment of the invention.

In FIG. 7, the horizontal axis represents the vehicle speed and the vertical axis represents the ratio Kalign of the road surface reaction torque (alignment torque) Talign to the steering angle θhdl. Characteristic D shows that the ratio Kalign of the road surface reaction torque (alignment torque) Talign to the steering angle θhdl is small when the vehicle speed Sveh is low and increases as the vehicle speed Sveh becomes high.

Next, the operation of the first embodiment will be described.

The electric power steering control apparatus has a main function of measuring steering torque Thdl of a manipulation of the driver on the steering wheel 1 with the torque sensor 3 as a steering torque detection signal Tsens and generates assist torque Tassist for assisting the steering torque Thdl in accordance with the steering torque detection signal Tsens. To realize a better feeling and higher stability of steering, sensors are provided that measure a steering angle θhdl of the steering wheel 1 and a rotation speed or a rotation angular velocity (or an angular acceleration obtained by differentiating it) of the EPS motor 4. A detection signal Imtr_sens of the drive current Imtr of the EPS motor 4 and a detection signal vt_sens of the drive voltage Vt applied between the terminals of the motor 4 are also captured by the EPS-ECU 5.

In terms of dynamics, the sum of the steering torque Thdl and the assist torque Tassist rotates the steering shaft 1A against the steering shaft reaction torque Ttran. In turning the steering wheel 1, an inertia term (J represents the inertia gain of the motor 4) of the motor 4 also contributes. Therefore, a relationship of Equation (1) holds:

$$Ttran = Thdl + Tassist - J \cdot d\omega/dt. \quad (1)$$

The assist torque Tassist of the motor 4 is given by Equation (2)

$$Tassist = Ggear \times Kt \times Imtr \quad (2)$$

where Ggear is the reduction gear ratio of the reduction gears 7 of the electric power steering control apparatus.

On the other hand, the steering shaft reaction torque Ttran is the sum of the road surface reaction torque Talign and the total friction torque Tfric_all in the steering mechanism and is given by Equation (3):

$$Ttran = Talign + Tfric\_all. \quad (3)$$

The EPS-ECU 5 that is a controller of the electric power steering control apparatus calculates a target value of the drive current Imtr of the EPS motor 4 on the basis of the above-mentioned sensor signals and performs a current control so that the actual drive current Iact of the EPS motor 4 coincides with the calculated target value. The EPS motor 4 generates prescribed torque that is a drive current value multiplied by a torque constant and a motor-to-steering-shaft gear ratio, and the resulting torque assists the steering torque Thdl of the driver.

Next, a road surface reaction torque estimation method will be described.

Constructed for a lane change manipulation during a middle or low-speed cruise, conventional road surface reaction torque detectors of electric power steering control apparatus can estimate road surface reaction torque correctly only in the case of low-frequency steering during middle or low-speed driving. The present invention has an object of enabling correct road surface reaction torque estimation in a wide range of operation conditions and to thereby make it possible to use a road surface reaction torque estimation value as a target value of a steering torque generation device of a steer-by-wire apparatus in which a steering wheel and tires are not connected to each other mechanically.

The road surface reaction torque detector 15 performs estimation according to the principle of calculation of road surface reaction torque shown in FIG. 2. In electric power steering control apparatus, it is difficult to directly remove influence of the friction term because the steering shaft rotation speed cannot be detected with high accuracy. This is the reason why a filter is used for the estimation.

As shown in FIG. 2, a road surface reaction torque estimation value Ttire_est is estimated by inputting steering shaft reaction torque signal Ttran_sens to the low-pass filter element 151.

Although steering is performed in various kinds of situations such as driving along a curved road and a lane change, in a prescribed period their steering patterns are regarded as ramp patterns having a constant speed. With this assumption, road surface reaction torque varies like characteristic B in FIG. 3 and friction torque varies like characteristic C in FIG. 3. Steering shaft reaction torque Ttran that is the sum of the road surface reaction torque and the friction torque varies like characteristic A in FIG. 3. That is, the road surface reaction torque Talign and the steering shaft reaction torque Ttran are given by Equations (4) and (5), respectively (s:Laplace transform variable):

$$Talign = Tgrad/s^2 \qquad (4)$$

$$Ttran = Tgrad/s^2 + (Ggear \times Tfric + Tfrp)/s \qquad (5)$$

where Tgrad is the temporal variation rate of the road surface reaction torque Talign, Ggear is the reduction gear ratio of the reduction gears 7 of the electric power steering control apparatus, Tfric is the steady-state friction torque of the EPS motor 4, and Tfrp is the friction torque in the steering mechanism.

The road surface reaction torque estimation value Ttire_est that is obtained by filtering the steering shaft reaction torque Ttran with the low-pass filter element 151 is given by Equation (6):

$$Ttire\_est = \{Tgrad/s^2 + (Ggear \times Tfric + Tfrp)/s\} \times 1/(\tau est \times s + 1) \qquad (6)$$

The estimation error E(s) of the road surface reaction torque estimation value Ttire_est from the road surface reaction torque Talign as a state variable to be estimated is given by Equation (7):

$$E(s) = Tgrad/s^2 - \{Tgrad/s^2 + (Ggear \times Tfric + Tfrp)/s\} \times \qquad (7)$$
$$1/(\tau est \times s + 1)$$
$$= \{Tgrad \times \tau est - (Ggear \times Tfric + Tfrp)\}/\{s \times (\tau est \times s + 1)\}.$$

Therefore, the estimation error E(s) becomes 0 when the time constant τest of the low-pass filter element 151 is given by Equation (8) (see FIG. 3):

$$\tau est = (Ggear \times Tfric + Tfrp)/Tgrad \qquad (8)$$

The temporal variation rate Tgrad of the road surface reaction torque Talign is given by Equation (9) as a product of the steering speed ωs and the ratio Kalign of the road surface reaction torque Talign to the steering angle:

$$Tgrad = dTalign/dt = dTalign/d\theta s \times d\theta s/dt \qquad (9)$$
$$= Kalign \times \omega s$$

Of these factors, the ratio Kalign of the road surface reaction torque Talign to the steering angle is uniquely determined for each vehicle speed as shown in FIG. 7 if a vehicle type is specified. The steering speed ωs can be detected. Therefore, an optimum value of the time constant τest of the low-pass filter element 151 is given by Equation (10):

$$\tau est = (Ggear \times Tfric + Tfrp)/Tgrad \qquad (10)$$
$$= (Ggear \times Tfric + Tfrp)/(Kalign \times \omega s).$$

Therefore, by making the time constant rest of the low-pass filter element 151 variable by using the blocks 22–24 as shown in the block diagram of FIG. 5, the road surface reaction torque Ttire_est can be estimated even if the steering speed ωs varies due to a variation of rotation speed Smtr of the EPS motor 4 or the vehicle speed Sveh varies.

FIGS. 4 and 5 show the configuration of the first embodiment.

In the first embodiment, the controlled variable of the electric power steering is determined by the vehicle speed signal Sveh_sens of the vehicle speed detector 11, the steering torque detection signal Tsens of the steering torque detector 12, the road surface reaction estimation value Ttire_est of the road surface reaction detector 15, the motor rotation speed signal Smtr_sens of the motor speed detector 13, and the motor acceleration signal Amtr_sens of the motor acceleration detector 14. Since the novel feature of the invention relates to the detection of road surface reaction torque, the road surface reaction detector 15 will be described below in detail.

In the first embodiment, in the rood surface reaction detector 15, as shown in FIG. 5, a steering shaft reaction torque Ttran is supplied to the block 21 for detecting steering shaft reaction torque signal Ttran_sens. A vehicle speed signal Sveh_sens is supplied to the block 22 for calculating a ratio Kalign of road surface reaction torque to a steering angle. A motor rotation speed signal Smtr_sens is input to the block 23 for calculating a time constant τest of the low-pass filter element 151.

A steering shaft reaction torque signal Ttran_sens can be obtained by attaching a detector such as a load cell (i.e., steering shaft reaction torque detecting means) to the steering shaft column and measuring its state variable, and is detected as torque (i.e., steering shaft reaction torque) occurring on the steering shaft column.

A motor rotation speed signal Smtr_sens is obtained by using an output of the motor speed detector 13. Alternatively, a motor rotation speed can be obtained according to the following Equation (11) using a motor current output.

In the first embodiment and the following embodiments, the motor speed detector 13 may detect a motor rotation speed by either measurement or calculation.

Figure 8:
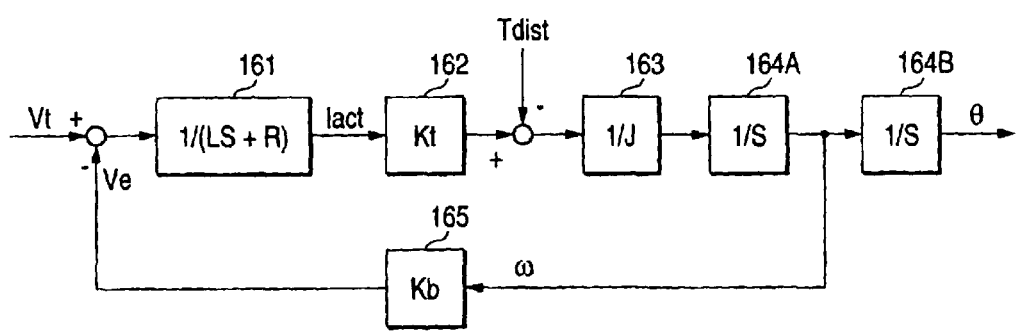
FIG. 8 is a block diagram showing the configuration of a motor speed calculation section of the electric power steering control apparatus according to the first embodiment of the invention.

For example, FIG. 8 shows a case of detecting a motor rotation speed by calculation.

FIG. 8 is a block diagram showing the configuration of a calculation section of the case of obtaining a motor rotation speed by calculation in the motor speed detector 13 of the electric power steering control apparatus according to the first embodiment of the invention.

In FIG. 8, reference numeral 161 denotes an operation block corresponding to the EPS motor 4 in which the denominator is a sum of a coil resistance R of the EPS motor 4 and a product Ls of a coil inductance L of the EPS motor 4 and the Laplace transform variable s. The block 161 receives the difference Vt−Ve between a drive voltage Vt of the EPS motor 4 and a counterelectromotive force Ve of the EPS motor 4. Reference numeral 162 denotes an operation block that receives an actual drive current Iact of the EPS motor 4 from the operation block 161 and generates a torque output by multiplying the actual drive current Iact by a torque constant Kt. Reference numeral 163 denotes a gain operation block that receives the difference the torque output of the operation block 162 and disturbance torque Tdist. Reference symbols 164A and 164B denote integrators. The integrator 164A integrates an output of the gain operation block 163 and supplies an integration result to an operation block 165 of a counterelectromotive force constant Kb. The operation block 165 generates the counterelectromotive force Ve. The calculation section of FIG. 8 can calculate the rotation speed ω of the EPS motor 4 according to Equation (11) using the drive voltage Vt of the EPS motor 4, the counterelectromotive force Ve of the EPS motor 4 that is generated by the operation block 165, and the coil resistance R and the coil inductance L of the EPS motor 4.

FIG. 8 shows the configuration for estimating a motor rotation speed by calculation. With this configuration, the motor rotation speed ω can be calculated according to Equation (11) by using the drive voltage Vt of the EPS motor 4, its counterelectromotive force Ve, and the coil resistance R and the coil inductance L that are constants specified by the EPS motor 4. In Equation (11), Kt is the torque constant, J is the inertia constant gain of the EPS motor 4, Kb is the counterelectromotive force constant, and s is the Laplace transform variable. Symbol Imtr represents the drive current of the EPS motor 4 and Imtr means its imaginary part.

First, the following two relationships hold:

$$R \times Imrt + L \times Imtr = Vt + Ve$$

$$Ve = Vt - (R \times Imtr + L \times Imtr).$$

Since L×Imtr is substantially 0 at steering frequencies, the following equation is obtained:

$$ve = Vt - R \times Imtr.$$

Therefore, a relationship $$\omega = Ve/Kb = (Vt - R \times Imtr)/Kb \qquad (11)$$

is obtained.

Next, the operation of the road surface reaction torque detector 15 will be described with reference to the flowchart of FIG. 6. In this process, a time constant τest is determined according to Equation (10) at step 5105 in FIG. 6.

At step S101, steering shaft reaction torque signal Ttran_sens is read into a memory. At step S102, a vehicle speed signal Sveh_sens is read into the memory. At step S103, a motor rotation speed signal Smtr_sens is read into the memory. At step S104, a ratio Kalign of road surface reaction torque to a steering angle is calculated according to FIG. 7 on the basis of the vehicle speed Sveh_sens. At step S105, a time constant τest of the low-pass filter element 151 is calculated on the basis of the motor rotation speed Smtr_sens and the ratio Kalign. At step S106, the steering shaft reaction torque signal Ttran_sens is input to the low-pass filter element 151 and filtered by its low-pass filter operation. At step S107, a road surface reaction torque estimation value Ttire_est is obtained.

In the first embodiment, the time constant τest of the low-pass filter element 151 is determined in accordance with the vehicle speed Sveh and the steering speed that is obtained from the rotation speed Smtr of the EPS motor 4, which makes it possible to estimate the road surface reaction torque even if the steering speed or the vehicle speed Sveh varies.

Further, in the first embodiment, the time constant τest of the low-pass filter element 151 is determined according to the equation $$\tau est = (Ggear \times Tfric + Tfrp)/(Kalign \times \omega s)$$

where Ggear is the gear ratio of the reduction gears 7 for transmitting: assist torque Tassist from the EPS motor 4 to the steering shaft 1A, Tfric is the steady-state friction torque of the EPS motor 4, Tfrp is the friction torque in the steering mechanism, Kalign is the ratio of the road surface reaction torque that depends on the vehicle speed Sveh to the steering angle, and ωs is the steering speed that is obtained from the motor rotation speed Smtr. Since the time constant τest of the low-pass filter element 151 is changed according to the above equation, the low-pass filter element 151 can minimize the estimation error irrespective of the running pattern; the estimation accuracy of the road surface reaction torque can be increased.

Embodiment 2

Figure 9:
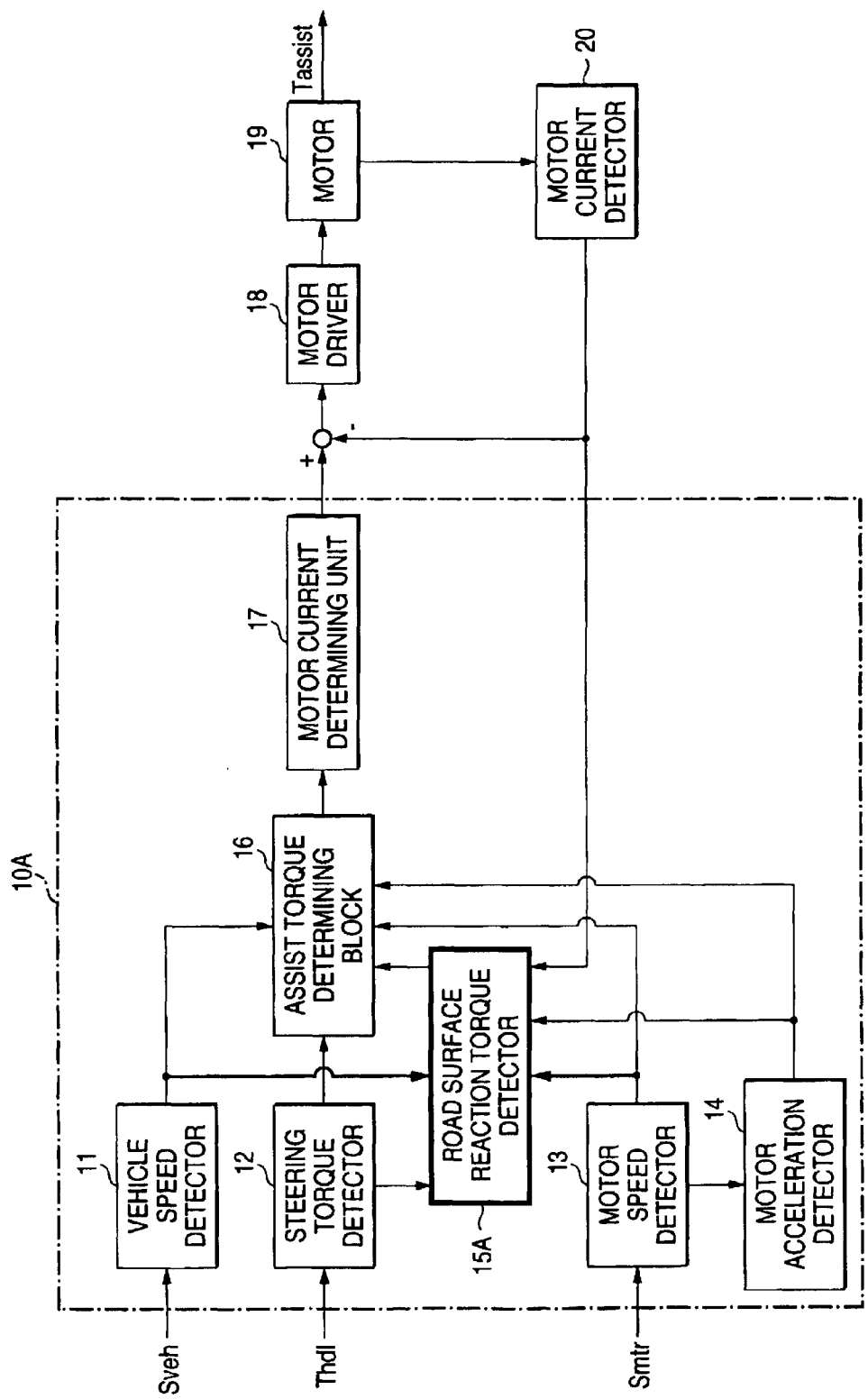
FIG. 9 is a block diagram of an electric power steering control apparatus according to a second embodiment of the invention.
Figure 10:
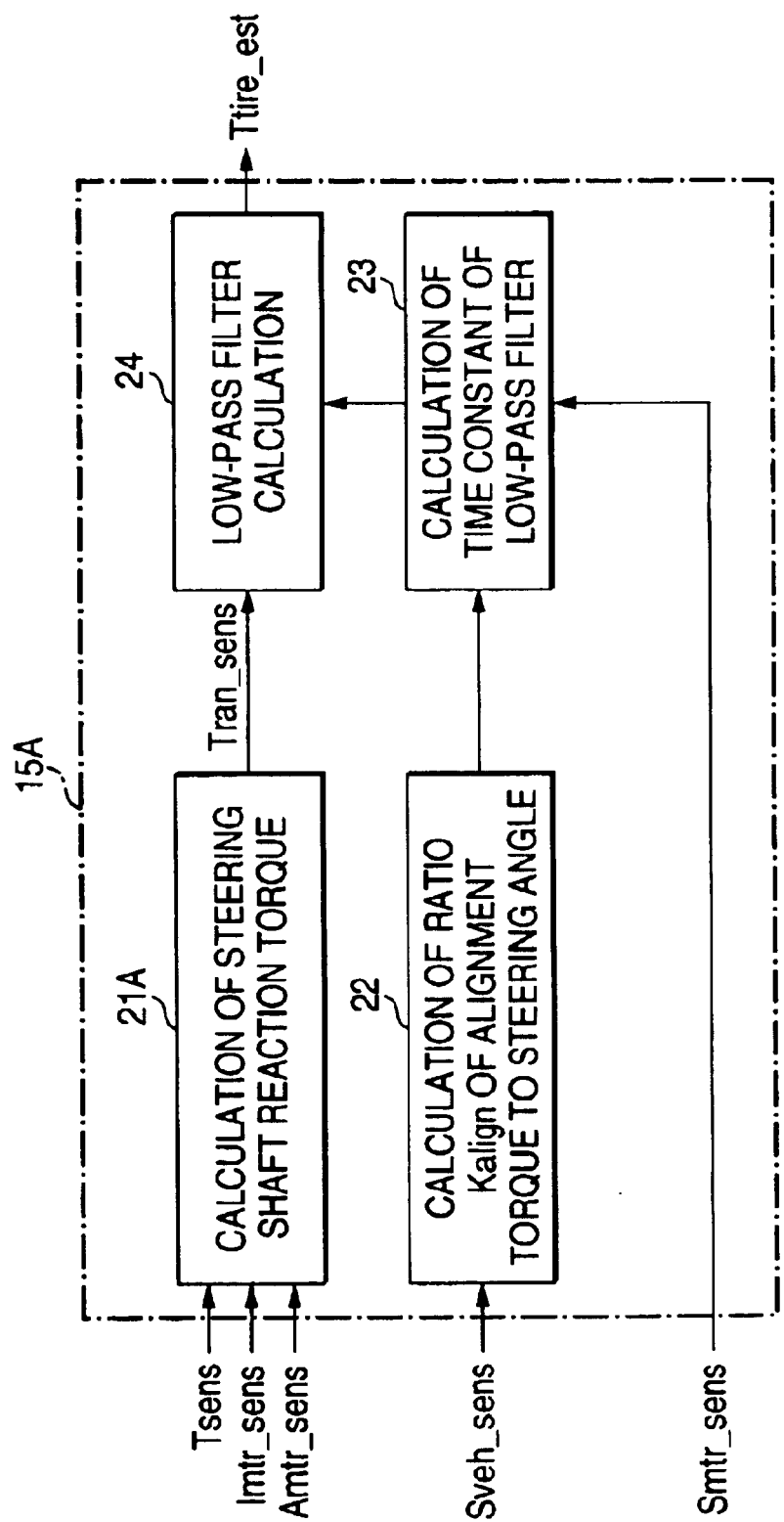
FIG. 10 is a block diagram of a road surface reaction torque detector of the electric power steering control apparatus according to the second embodiment of the invention.

FIG. 9 is a block diagram showing the configuration of an electric power steering control apparatus according to a second embodiment of the invention. A block 10A enclosed by dot-dashed lines in FIG. 9 is a block for calculating a target value of the drive current Imtr of the motor 4. In the second embodiment, a road surface reaction torque detector 15A is used instead of the road surface reaction torque detector 15 shown in FIGS. 4 and 5. FIG. 10 is a block diagram showing the configuration of the road surface reaction torque detector 15A of the electric power steering control apparatus according to the second embodiment of the invention. A block enclosed by dot-dashed lines corresponds to the road surface reaction torque detector 15A.

In FIG. 9, whereas the road surface reaction torque detector 15A is used, the sections 11–20 are the same as in FIG. 4. As shown in FIG. 10, the road surface reaction torque detector 15A has blocks 21A, 22, 23 and 24. The blocks 22–24 are same as in FIG. 5. The block 21A is a steering shaft reaction torque calculation block for calculating the steering shaft reaction signal Ttran_sens on the basis of the steering torque detection signal Tsens, the motor current detection signal Imtr_sens, and the motor rotation acceleration signal Amtr_sens inputted to the block 21A from the steering torque detector 12, the motor current detector 20, and the motor acceleration detector 14, respectively. In the second embodiment, no steering shaft reaction torque Ttran is input to the block 21A unlike in FIG. 4. The block 21A calculates steering shaft reaction torque signal Ttran_sens on the basis of the steering torque detection signal Tsens, the motor current detection signal Imtr_sens, and the motor rotation acceleration signal Amtr_sens, according to Equation (1)–(3).

Figure 11:
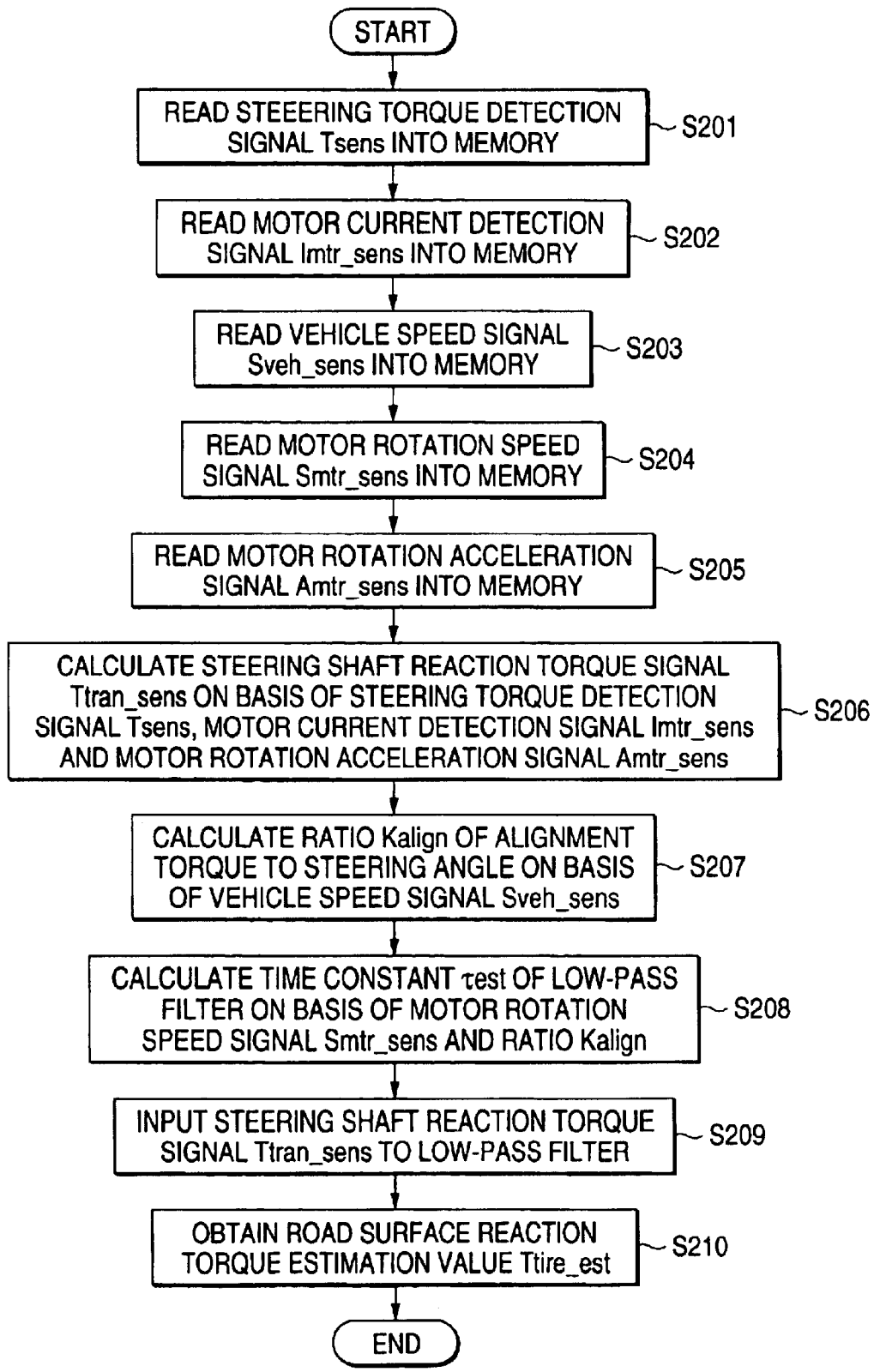
FIG. 11 is a flowchart of a process that is executed by the road surface reaction torque detector of the electric power steering control apparatus according to the second embodiment of the invention.

FIG. 11 is a flowchart of a process that is executed by the road surface reaction torque detector 15A of the electric power steering control apparatus according to the second embodiment of the invention.

Steering shaft reaction torque signal Ttran_sens is filtered by the low-pass filter element 151 to obtain a road surface reaction torque signal Ttire_est. Whereas in the first embodiment steering shaft reaction torque signal Ttran_sens is measured, in the second embodiment steering shaft reaction torque signal Ttran_sens that is calculated according to Equations (1)–(3) is used. Except for this difference, the process of FIG. 11 is the same as that of FIG. 6.

Next, the operation of the road surface reaction torque detector 15A will be described with reference to the flowchart of FIG. 11. In this process, a time constant τest is determined according to Equation (10) at step S208.

At step S201, a steering torque detection signal Tsens of the steering torque detector 12 is read into a memory. At step S202, a motor current detection signal Imtr_sens of the motor current detector 20 is read into the memory. At step S203, a vehicle speed signal Sveh_sens of the vehicle speed detector 11 is read into the memory. At step s204, a motor rotation speed signal Smtr_sens of the motor speed detector 13 is read into the memory. At step 5205, a motor rotation acceleration signal Amtr_sens of the motor acceleration detector 14 is read into the memory. At step S206 (steering shaft reaction torque signal outputting means), steering shaft reaction torque signal Ttran_sens is calculated on the basis of the steering torque detection signal Tsens, the motor current detection signal Imtr_sens, and the motor rotation acceleration signal Amtr_sens. At step S207, a ratio Kalign of road surface reaction torque (alignment torque) to a steering angle is calculated on the basis of the vehicle speed signal Sveh_sens. At step S208, a time constant τest of the low-pass filter element 151 is calculated on the basis of the motor rotation speed signal Smtr_sens and the ratio Kalign. At step S209, the steering shaft reaction torque signal Ttran sens is filtered by the low-pass filter element 151. At step S210, a road surface reaction torque estimation value Ttire_est is obtained.

By calculating steering shaft reaction torque signal Ttran_sens, the second embodiment provides the same advantages as the first embodiment even in the case where steering shaft reaction torque Ttran cannot be measured.

Embodiment 3

Figure 12:
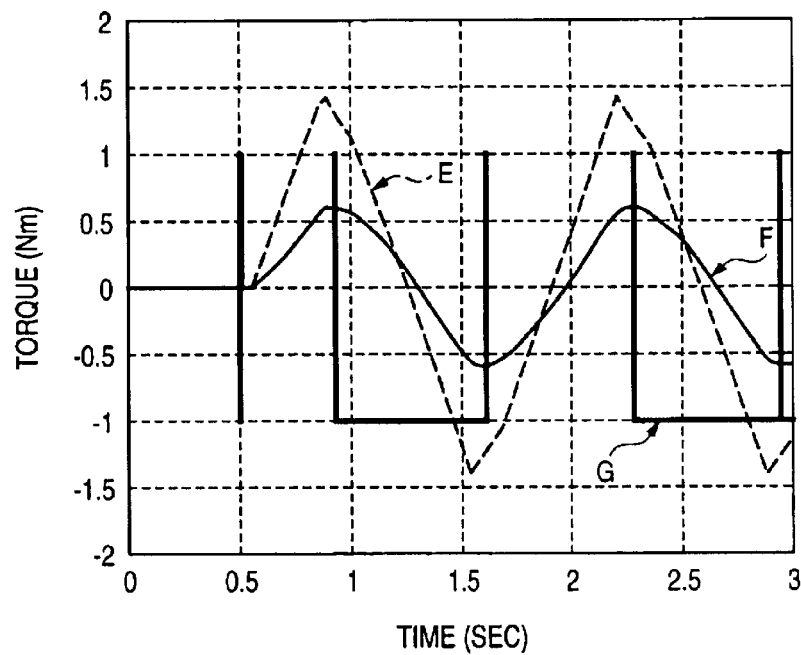
FIG. 12 is a characteristic diagram showing a relationship between the road surface reaction torque and the steering angle in an electric power steering control apparatus according to a third embodiment of the invention.

FIG. 12 is a characteristic diagram showing a relationship between the road surface reaction torque and the steering angle in an electric power steering control apparatus according to a third embodiment of the invention. In FIG. 12, the vertical axis represents the torque (N·m) and the horizontal axis represents the time (s). Characteristic E is road surface reaction torque Talign (divided by 50), characteristic F is a steering angle θhdl, and characteristic G is the steering shaft speed. The steering shaft speed is proportional to the motor rotation speed.

Figure 13:
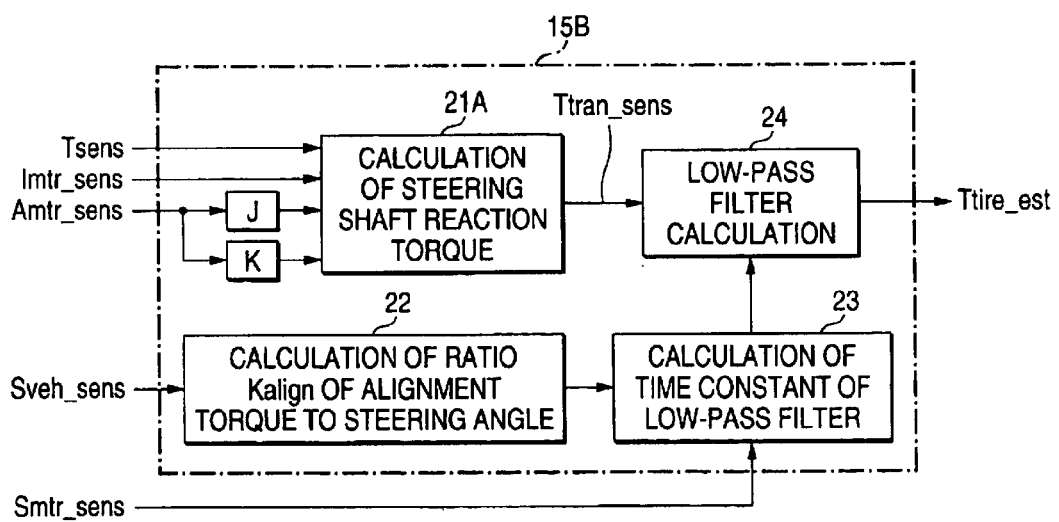
FIG. 13 is a block diagram of a road surface reaction torque detector of the electric power steering control apparatus according to the third embodiment of the invention.

FIG. 13 is a block diagram showing the configuration of a road surface reaction torque detector 15B of the electric power steering control apparatus according to the third embodiment of the invention. A block enclosed by dot-dashed lines corresponds to the road surface reaction torque detector 15B.

In FIG. 13, the blocks 21A, 22, 23 and 24 are the same as shown in FIG. 10. Reference characters J and K denote operators. The operator J multiplies a motor rotation acceleration signal Amtr_sens by an inertia gain of the EPS motor 4, and the operator K multiplies a motor rotation acceleration signal Amtr_sens by an acceleration gain of the EPS motor 4.

Figure 14:
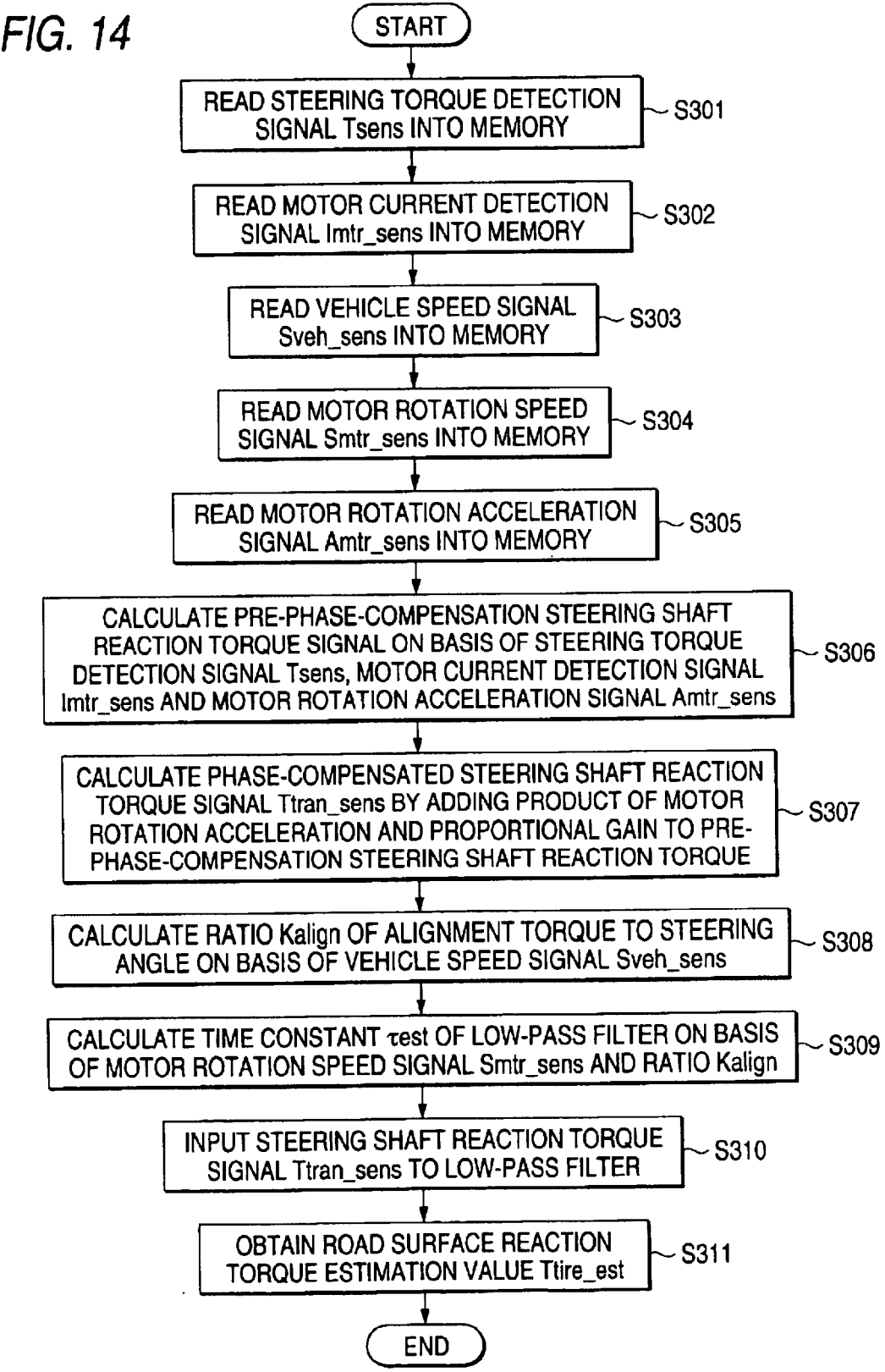
FIG. 14 is a flowchart of a process that is executed by the road surface reaction torque detector of the electric power steering control apparatus according to the third embodiment of the invention.

FIG. 14 is a flowchart of a process that is executed by the road surface reaction torque detector 15B of the electric power steering control apparatus according to the third embodiment of the invention.

Figure 15:
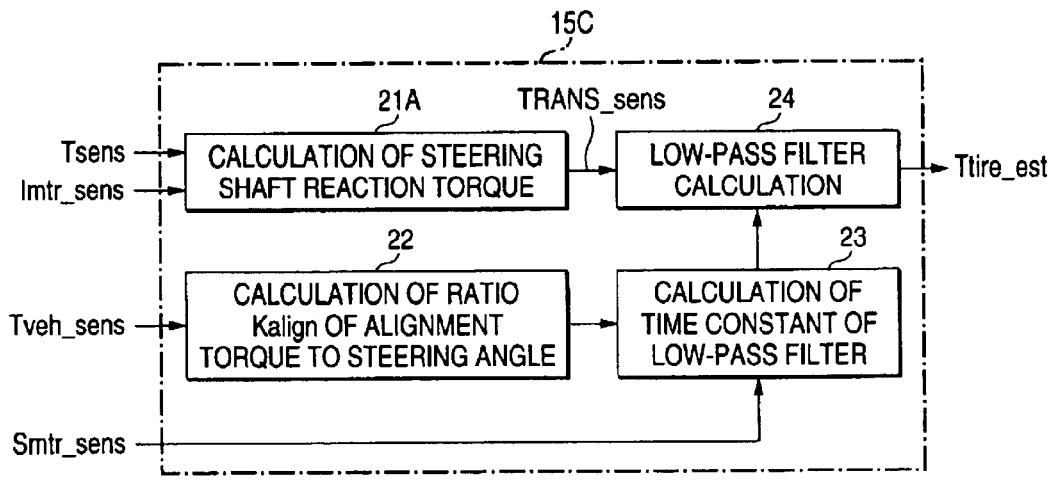
FIG. 15 is a block diagram of another road surface reaction torque detector of the electric power steering control apparatus according to the third embodiment of the invention.

FIG. 15 is a block diagram showing the configuration of another road surface reaction torque detector 15C used in the electric power steering control apparatus according to the third embodiment of the invention. A block enclosed by dot-dashed lines corresponds to the road surface reaction torque detector 15C.

In FIG. 15, whereas the sections 21A, 22, 23, 24 are the same as shown in FIG. 10, steering shaft reaction torque signal Ttran sens is calculated on the basis of a steering torque detection signal Tsens and a motor current detection signal Imtr_sens.

In the second embodiment, quick steering may cause an event that the road surface reaction torque Talign (characteristic E in FIG. 12) leads the steering angle θhdl (characteristic F) in phase. In this case, at the time of a cut of the steering wheel 1, the road surface reaction torque Talign starts to decrease earlier than the sign of the steering speed is reversed. Equation (5) does not hold for the steering shaft reaction torque Ttran and assumes such a waveform as to be delayed from the road surface reaction torque Talign.

To avoid this phenomenon, it is effective to compensate for a delay of the steering shaft speed. To compensate for a delay of the steering shaft speed in Equation (1) in the first and second embodiments, a term that is a product of the motor rotation acceleration (or steering shaft acceleration) and a proportional gain K is added as in the following Equation (12):

$$Ttran = Thdl + Tassist - J \cdot d\omega/dt + K \cdot d\omega. \qquad (12)$$

The operators J and K in FIG. 13 perform operations corresponding to the third and fourth terms, respectively, on the right side of Equation (12).

Since the entire configuration of the electric power steering control apparatus is the same as in the second embodiment, only the road surface reaction torque detector 15B is shown in FIG. 13.

To obtain a road surface reaction torque estimation value Ttire_est, steering shaft reaction torque Ttran is filtered by the low-pass filter element 151. In the third embodiment, to compensate for a delay of the steering shaft speed, the term that is the product of the motor rotation acceleration and the proportional gain K is added as in the above Equation (12) in calculating the steering shaft reaction torque Ttran. The third embodiment is the same as the second embodiment except for this feature.

This operation will be described with reference to the flowchart of FIG. 14. In this process, a time constant τest is determined according to Equation (10) at step S309.

At step S301, a steering torque detection signal Tsens of the steering torque detector 12 is read into a memory. At step S302, a motor current detection signal Imtr_sens is read into the memory. At step S303, a vehicle speed signal Sveh_sens is read into the memory. At step S304, a motor rotation speed signal Smtr_sens is read into the memory. At step S305, a motor rotation acceleration signal Amtr_sens is read into the memory. At step S306, pre-phase-compensation steering shaft reaction torque signal is calculated on the basis of the steering torque detection signal Tsens, the motor current detection signal Imtr_sens, and the motor rotation acceleration signal Amtr_sens. At step S307, phase-compensated steering shaft reaction torque signal Ttran_sens is calculated by adding the product of the motor rotation acceleration dω/dt and a proportional gain K to the pre-phase-compensation steering shaft reaction torque. At step S308, a ratio Kalign of road surface reaction torque (alignment torque) Talign to a steering angle θsens is calculated on the basis of the vehicle speed signal Sveh_sens. At step S309, a time constant τest of the low-pass filter element 151 is calculated on the basis of the motor rotation speed signal Smtr_sens and the ratio Kalign. At step S310, the phase compensated steering shaft reaction torque signal Ttran_sens is filtered by the low-pass filter element 151. At step S311, a road surface reaction torque estimation value Ttire_est is obtained.

In the third embodiment, the phase compensated steering shaft reaction torque signal Ttran_sens that is filtered by the low-pass filter element 151 includes the term that is the product of a motor rotation acceleration dω/dt (i.e., steering shaft rotation acceleration) and the proportional gain K. This makes it possible to avoid the phenomenon that the road surface reaction torque leads the steering angle in phase, and to thereby increase the accuracy of estimation of road surface reaction torque even for quick steering patterns.

Where the motor inertia gain is approximately equal to the acceleration gain, the road surface reaction torque detector 15C of FIG. 15 may be used in which the acceleration term(s) is disregarded in Equations (1) and (12). Even in this case, the same advantages as in the second embodiment can be provided. The road surface reaction torque detector 15C of FIG. 15 is different from the road surface reaction torque detector 15B of FIG. 13 in that no motor rotation acceleration signal Amtr_sens is input into the block 21A and the operators J and K are omitted.

Embodiment 4

A fourth embodiment uses a road surface reaction torque detector 15D. The fourth embodiment is the same as the first embodiment except for the configuration of the road surface reaction torque detector 15D. Therefore, the entire configuration of the fourth embodiment will not be described.

Figure 16:
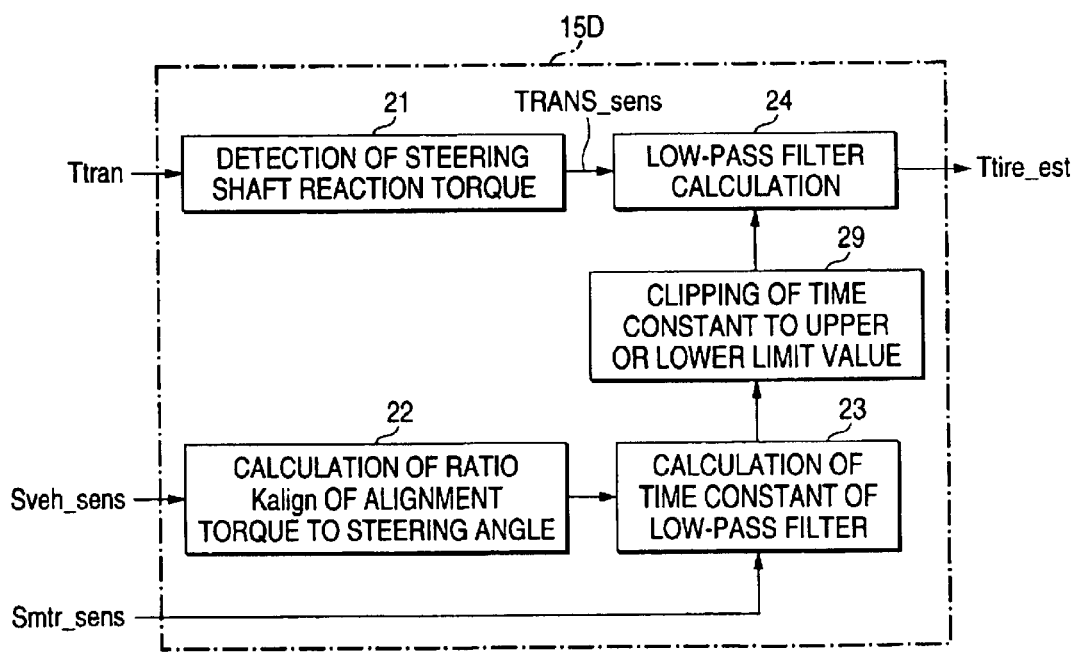
FIG. 16 is a block diagram of a road surface reaction torque detector of an electric power steering control apparatus according to a fourth embodiment of the invention.

FIG. 16 is a block diagram showing the configuration of the road surface reaction torque detector 15D of an electric power steering control apparatus according to the fourth embodiment of the invention. A block enclosed by dot-dashed lines corresponds to the road surface reaction torque detector 15D.

In FIG. 16, the blocks 21–24 are the same as in FIG. 5. A block 29 is a time constant upper/lower limit clipping section that receives an output of the low-pass filter element time constant calculating section 23 and produces upper and lower limit values of the time constant τest of the low-pass filter element 151. The output of the section 29 is input to the low-pass filter calculation section 24, whereby the time constant test of the low-pass filter element 151 is clipped so as to fall within the range defined by the upper and lower limit values.

Figure 17:
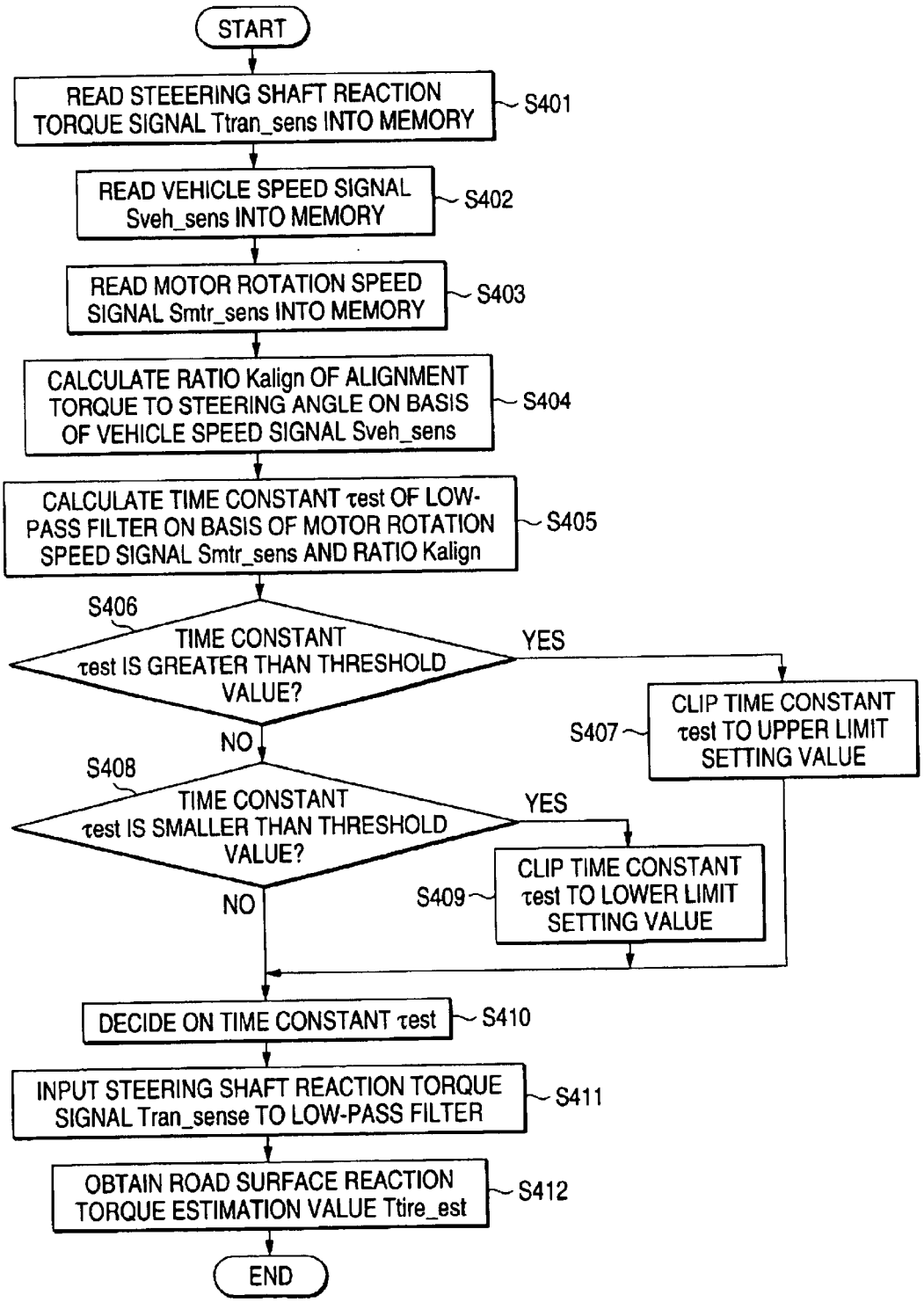
FIG. 17 is a flowchart of a process that is executed by the road surface reaction torque detector of the electric power steering control apparatus according to the fourth embodiment of the invention.

FIG. 17 is a flowchart of a process that is executed by the road surface reaction torque detector 15D of the electric power steering control apparatus according to the fourth embodiment of the invention.

In the first to third embodiments, road surface reaction torque Ttire_est is obtained by filtering steering shaft reaction torque signal Ttran_sens by the first-order low-pass filter element 151. In the fourth embodiment, upper and lower limits are set for the time constant test of the low-pass filter element 151. The fourth embodiment is the same as the first embodiment except for this feature.

Next, the operation of the road surface reaction torque detector 15D according to the fourth embodiment will be described with reference to the flowchart of FIG. 17. In this process, a time constant τest is determined according to Equation (10) at step S410 shown in FIG. 17.

At step S401, steering shaft reaction torque signal Ttran sens is read into a memory. At step S402, a vehicle speed Sveh_sens is read into the memory. At step S403, a motor rotation speed Smtr_sens is read into the memory. At step S404, a ratio Kalign of road surface reaction torque (i.e., alignment torque) Talign to a steering angle θsens is calculated according to FIG. 7 on the basis of the vehicle speed Sveh_sens. At step S405, a time constant τest of the low-pass filter element 151 is calculated on the basis of the motor rotation speed Smtr_sens and the ratio Kalign. At step S406, it is judged whether the time constant _est of the low-pass filter element 151 is greater than an upper limit value. If the time constant τest is judged greater than the upper limit value, the time constant τest is clipped to the upper limit value at step S407 and the process goes to step S410. If it is judged at step S406 that the time constant rest of the low-pass filter element 151 is not greater than the upper limit value, it is judged at step S408 whether the time constant τest is smaller than a lower limit value. If the time constant τest of the low-pass filter element 151 is judged smaller than the lower limit value, the time constant rest is clipped to the lower limit value at step S409 and the process goes to step S410. The process also goes to step S410 if it is judged at step S408 that the time constant τest is not smaller than the lower limit value. At step S410, the time constant rest of the low-pass filter element 151 is decided on. At step S411, the steering shaft reaction torque signal Ttran_sens is filtered by the low-pass filter element 151. At step S412, a road surface reaction torque estimation value Ttire_est is obtained.

When a time constant τest of the low-pass filter element 151 is calculated according to Equation (10) by using motor rotation speed Smtr and a vehicle speed Sveh, too large a time constant est is obtained if the vehicle speed Sveh or the steering speed is low. In this case, the filtering operation becomes close to integration and hence tends to be influenced by an offset component from a true value of steering shaft reaction torque signal Ttran_sens.

Conversely, too small a time constant τest is obtained if the vehicle speed Sveh or the steering speed is high. In this case, the filtering characteristic becomes close to a gain characteristic and the low-pass filter element 151 cannot reject noise components. The setting of the upper and lower limit values solves those problems.

As described above, in the fourth embodiment, the time constant τest of the low-pass filter element 151 falls within the range defined by the upper and lower limit values. This prevents an event that the road surface reaction torque estimation value has too large an error with respect to a true value, and thereby prevents divergence of the time constant τest of the low-pass filter element 151.

Embodiment 5

Figure 18:
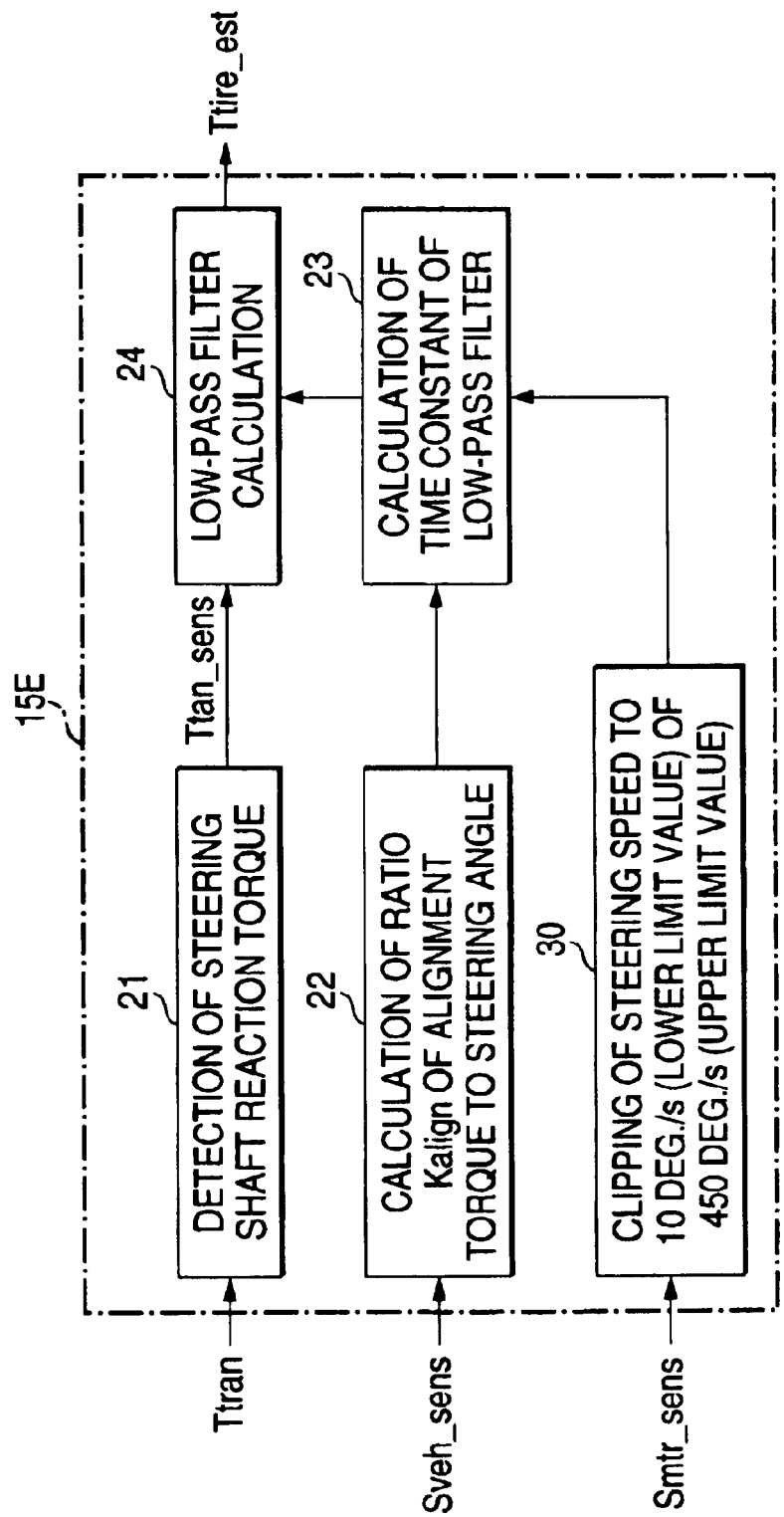
FIG. 18 is a block diagram of a road surface reaction torque detector of an electric power steering control apparatus according to a fifth embodiment of the invention.

FIG. 18 is a block diagram showing the configuration of a road surface reaction torque detector 15E of an electric power steering control apparatus according to a fifth embodiment of the invention. A block enclosed by dot-dashed lines corresponds to the road surface reaction torque detector 15E.

In FIG. 18, the blocks 21–24 are the same as in FIG. 5. A block 30 is a steering speed upper/lower limit clipping section that receives a motor rotation speed signal Smtr_sens and clips a steering speed to an upper or lower limit value.

An analysis of the steering of drivers leads to a conclusion that the steering speed of general driving has certain limits. The road surface reaction torque detector 15E is configured as shown in FIG. 18 by setting the lower and upper limits of the steering speed to 10 deg./s and 450 deg./s, for example, with consideration given to actual steering speeds of drivers. In the road surface reaction torque detector 15E, a motor rotation speed signal Smtr_sens of the motor speed detector 13 is input into the additional block 30 and an output of the block 30 is supplied to the block 23. In the block 23, a time constant τest is calculated on the basis of a ratio Kalign and an upper/lower-limit-value-clipped steering speed that is supplied from the block 30. This makes it possible to decide on a time constant τest that is suitable for a steering speed of the driver.

According to the fifth embodiment, a time constant τest that is suitable for a steering speed of the driver is decided on and the same advantages as in the fourth embodiments can be provided. The fifth embodiment also provides an advantage that divergence of Equation (10) can be prevented.

Embodiment 6

Figure 19A:
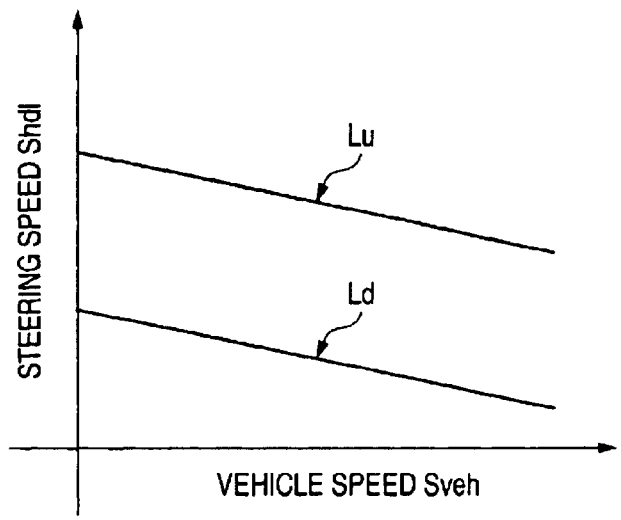
FIG. 19A is a block diagram of a road surface reaction torque detector of an electric power steering control apparatus according to a sixth embodiment of the invention.

FIG. 19A is a block diagram showing the configuration of a road surface reaction torque detector 15F of an electric power steering control apparatus according to a sixth embodiment of the invention. A block enclosed by dot-dashed lines corresponds to the road surface reaction torque detector 15F.

Figure 19B:
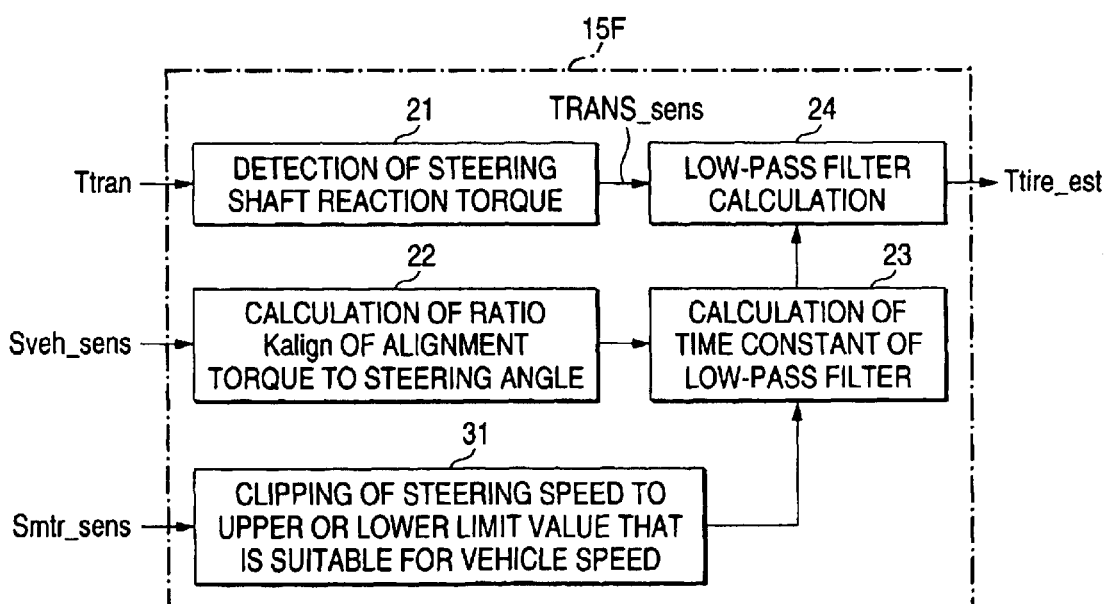
FIG. 19B is a characteristic diagram showing a relationship between the steering speed and the vehicle speed in the electric power steering control apparatus according to the sixth embodiment of the invention.

In FIG. 19A, the blocks 21–24 are the same as in FIG. 5. A block 31 is a steering speed upper/lower limit clipping section that receives a motor rotation speed signal Smtr_ sens and a vehicle speed signal Sveh_sens and clips a steering speed Shdl to an upper or lower limit value that is suitable for the vehicle speed Sveh. FIG. 19B shows a relationship between the steering speed Shdl and the vehicle speed Sveh in the block 31. In FIG. 19B, the vertical axis represents the steering speed Shdl and the horizontal axis represents the vehicle speed Sveh. Characteristic Lu is the upper limit value and characteristic Ld is the lower limit value.

An analysis of the steering of drivers leads to a conclusion that the steering speed Sveh of general driving tends to be high in a low vehicle speed range and tends to be low in a high vehicle speed range. The road surface reaction torque detector 15F is configured as shown in FIG. 19A in such a manner that the upper and lower limit values Lu and Ld of the steering speed Sdhl are varied in accordance with the vehicle speed Sveh. This makes it possible to determine the time constant τest in accordance with the vehicle speed Sveh and the steering speed Shdl of the driver.

According to the sixth embodiment, a time constant τest that is suitable for a vehicle speed Sveh and a steering speed Shdl of the driver is decided on and the same advantages as in the fourth embodiments can be provided. The sixth embodiment also provides an advantage that divergence of Equation (10) can be prevented.

Embodiment 7

Figure 20:
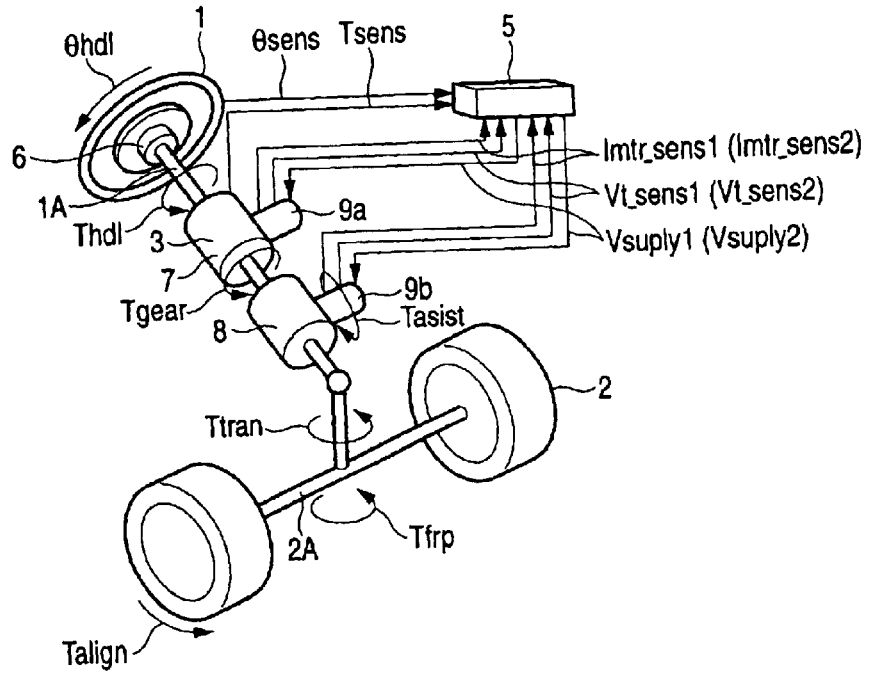
FIG. 20 shows the configuration of an electric power steering control apparatus according to a seventh embodiment of the present invention.

FIG. 20 is a schematic diagram showing an electric power steering control apparatus according to a seventh embodiment of the invention.

In FIG. 20, the members and unit denoted by reference numerals 1–3 and 5–7 are the same as shown in FIG. 1. Reference numeral 8 denotes planetary gears attached to the steering shaft 1A. Reference numerals 9a and 9b denote a variable gear motor (i.e., first motor) and a pinion shaft motor (i.e., second motor), respectively. The variable gear motor 9a is coupled to the steering shaft 1A via the reduction gears 7, and the pinion shaft motor 9b is coupled to the steering shaft 1A via the planetary gears 8. The combination of the variable gear motor 9a and the pinion shaft motor 9b constitute a electric motor device, instead of the electric motor 4 in FIG. 1.

In FIG. 20, symbol θhdl represents a steering angle of the steering wheel 1; θsens, a steering angle detection signal of the steering wheel 1; Tsens, a steering torque detection signal; Imtr_sens1, a drive current detection signal of the variable gear motor 9a; Imtr_sens2, a drive current detection signal of the pinion shaft motor 9b; Vt_sens1, a drive voltage detection signal of the variable gear motor 9a; Vt_sens2, a drive voltage detection signal of the pinion shaft motor 9b; Vsupply1, a supply voltage of the variable gear motor 9a; Vsupply2, a supply voltage of the pinion shaft motor 9b; Tgear, gear output torque of the variable gear motor 9a; Tassist, assist torque of the pinion shaft motor 9b; Thdl, steering torque; Ttran, steering shaft reaction torque; Tfrp, friction torque; and Talign, road surface reaction torque.

The steering-angle-superimposition-type electric power steering control apparatus incorporating the variable gear motor 9a for controlling the gear output torque Tgear and the pinion shaft motor 9b for controlling the actual steering angle has the following main function. Steering torque Thdl of a manipulation of the driver on the steering wheel 1 is measured by the torque sensor 3 as a steering torque detection signal Tsens. The gears of the variable gear mechanism are changed by the variable gear motor 9a in accordance with the steering torque detection signal Tsens, and gear output torque Tgear is generated that is stronger than the steering torque Thdl by a factor of a variable gear ratio. And assist torque Tassist for assisting the actual steering torque is generated by the pinion shaft motor 9b on the basis of the gear output torque Tgear.

To realize a better feeling and higher stability of steering, sensors are provided that measure a steering angle θhdl of the steering wheel 1 and a rotation speed or a rotation angular velocity (or an angular acceleration obtained by differentiating it) of the motor 9b. Drive current detection signals Imtr_sens1 and Imtr_sens2, drive voltage detection signals Vt_sens1 and Vt_sens2, supply voltage detection signals Vsupply1 and Vsupply2 of the motors 9a and 9b are also captured by the EPS-ECU 5.

In terms of dynamics, the steering torque Thdl is multiplied by the variable gear mechanism by the variable gear ratio Gvagear and the sum of the gear output torque Tgear and the assist torque Tassist rotates the steering shaft 1A against the steering shaft reaction torque Ttran. In turning the steering wheel 1, an inertia term of the pinion shaft motor 9b also contributes. Therefore, a relationship of Equation (13) holds:

$$Ttran = Tgear + Tassist - J \cdot \omega d/dt. \tag{13}$$

The assist torque Tassist of the pinion shaft motor 9b is given by Equation (14):

$$Tassist = Ggear \times Kt \times Imtr2 \tag{14}$$

where Imtr2 is the drive current of the motor 9b.

On the other hand, the steering shaft reaction torque Ttran is the sum of the road surface reaction torque Talign and the friction torque Tfric_all in the steering mechanism and is given by Equation (15):

$$Ttran = Talign + Tfric\_all. \tag{15}$$

The controller (EPS-ECU) 5 of the electric power steering control apparatus calculates a target value of the drive current Imtr2 of the motor 9b on the basis of the above-mentioned sensor signals and performs a current control so that the actual drive current of the motor 9b coincides with the calculated target value. The pinion shaft motor 9b generates prescribed torque that is a drive current value multiplied by a torque constant and a motor-to-steering-shaft gear ratio, and the resulting torque assists the steering torque Thdl of the driver.

The above configuration is generally called "steering angle super imposition" and is characterized in that the link mechanism for linking the steering wheel to the tires includes the variable gear mechanism for generating gear output torque that is driver-generated torque multiplied by a variable gear ratio and that the generated gear output torque is assisted by torque generated by the pinion shaft motor 9b.

The seventh embodiment is characterized in being capable of calculating road surface reaction torque in the steering-angle-superimposition-type configuration. Gear output torque can be measured by attaching the torque sensor 3 to a gear output torque generation portion of the steering shaft 1A. Steering shaft reaction torque Ttran can also be calculated according to Equation (13).

The technique described in the first to sixth embodiments can apply, as it is, to a technique for calculating road surface reaction torque Ttire_est after obtaining steering shaft reaction torque Ttran.

Although in the seventh embodiment gear output torque is detected by using the sensor, an equivalent value can be obtained by multiplying steering torque by a variable gear ratio in such a range that the friction in the variable gear mechanism is small even if no sensor is provided for that purpose.

The seventh embodiment can provide the same advantages as the first to sixth embodiments do even in the steering-angle-superimposition-type electric power steering control apparatus.

As described above, even in the steering-angle-superimposition-type configuration, the seventh embodiment makes it possible to estimate road surface reaction torque by detecting steering shaft reaction torque even if the steering speed or the vehicle speed varies.

Embodiment 8

Figure 21:
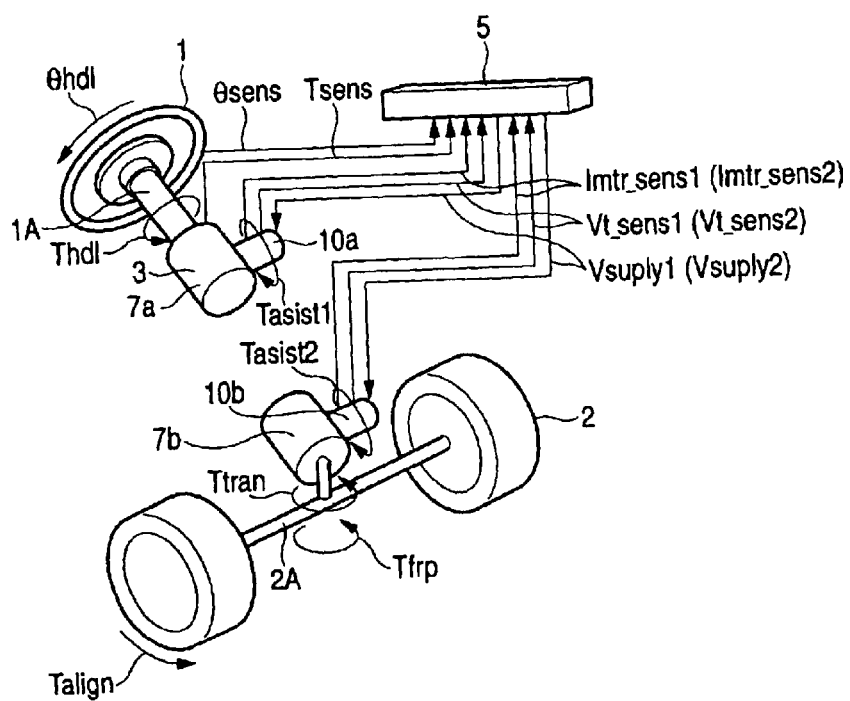
FIG. 21 shows the configuration of an electric power steering control apparatus according to an eighth embodiment of the present invention.

FIG. 21 is a schematic diagram showing an electric power steering control apparatus according to an eighth embodiment of the invention.

In FIG. 21, the members and unit denoted by reference numerals 1–3 and 5 are the same as shown in FIG. 1. Reference symbols 7a and 7b denote reduction gears. Reference symbols 10a and 10b denote a steering reaction torque control motor and an actual steering angle control motor, respectively. The combination of the steering reaction torque control motor 10a and the actual steering angle control motor 10b constitute the electric motor device, instead of the electric motor 4 in FIG. 1.

Symbol θhdl represents a steering angle of the steering wheel 1; θsens, a steering angle detection signal of the steering wheel 1; Tsens, a steering torque detection signal; Imtr sens1 and Imtr_sens2, drive current detection signals of the motor 10a and 10b; Vt_sens1 and Vt_sens2, drive voltage detection signals of the motors 10a and 10b; Vsupply1 and Vsupply2, supply voltages o'f the motors 10a and 10b; Tassist1, assist torque of the motor 10a; Tassist2, assist torque of the motor 10b; Thdl, steering torque; Ttran, steering shaft reaction torque; Tfrp, friction torque; and Talign, road surface reaction torque.

The steer-by-wire-type electric power steering control apparatus that incorporates the steering reaction torque control motor 10a for controlling the steering reaction torque and the actual steering angle control motor 10b for controlling the actual steering angle and in which the steering wheel 1 to be manipulated by a driver and the tires 2 are not connected to each other mechanically has the following main function. Steering torque Thdl of a manipulation of the driver on the steering wheel 1 is measured by the torque sensor 3 as a steering torque detection signal Tsens. Steering reaction assist torque Tassist1 for properly controlling the steering torque Thdl of the driver that corresponds to vehicle behavior is generated by the steering reaction torque control motor 10a on the basis of the torque detection signal Tsens. Actual steering angle control assist torque Tassist2 for controlling the actual steering angle of the tires 2 is generated by the actual steering angle control motor 10b.

To realize a better feeling and higher stability of steering, sensors are provided that measure a steering angle θhdl of the steering wheel 1 and rotation speeds or rotation angular velocities (or angular accelerations obtained by differentiating those) of the motors 10a and 10b. Drive current detection signals Imtr sens1 and Imtr_sens2 and drive voltage detection signals Vt sens1 and Vt sens2 of the motors 10a and 10b and supply voltage detection signals Vsupply1 and Vsupply2 applied between the motor terminals are also captured by the EPS-ECU 5.

In terms of dynamics, since the steering wheel 1 and the tires 2 are not connected to each other mechanically, entirely independent relationships hold for them. The steering torque Thdl and the steering reaction torque Tassist1 are balanced with each other and the assist torque Tassist2 that is generated by the actual steering angle control motor 10b rotates the tires 2 against the steering shaft reaction torque Ttran. In rotating the tires 2, an inertia term of the actual steering angle control motor 10b also contributes. Therefore, a relationship of Equation (16) holds:

$$Ttran = Tassist2 - J \cdot d\omega 2 / dt \qquad (16)$$

where ω2 is the angular velocity of the motor 10b.

The assist torque Tassist2 of the actual steering angle control motor 10b is given by Equation (17):

$$Tassist2 = Ggear2 \times Kt \times Imtr2 \qquad (17)$$

where Ggear2 is the gear ratio of the reduction gears 7b and Imtr2 is the drive current of the motor 10b.

On the other hand, the steering shaft reaction torque Ttran is the sum of the road surface reaction torque Talign and the friction torque Tfric_all in the steering mechanism and is given by Equation (18):

$$Ttran = Talign + Tfric\_all. \qquad (18)$$

The controller (EPS-ECU) 5 of the electric power steering control apparatus calculates a target value of the drive current Imtr2 of the motor 10b on the basis of the above-mentioned sensor signals and performs a current control so that the actual drive current of the motor 10b coincides with the calculated target value. The motor 10b generates prescribed torque that is a drive current value multiplied by a torque constant and a motor-to-steering-shaft gear ratio, and the resulting torque assists the steering torque Thdl of the driver.

The above configuration is generally called "steer-by-wire" and is characterized in that no mechanical link exists between the steering wheel 1 and the tires 2 and that the steering reaction torque control motor 10a for controlling the steering reaction torque that is transmitted to the steering wheel 1 and the actual steering angle control motor 10b for controlling the actual steering angle of the tires 2 on the basis of the steering angle of the driver and a vehicle state variable are provided. Because of no mechanical link between the steering wheel 1 and the tires 2, this mechanism increases the degree of freedom of the vehicle layout and can stabilize the vehicle irrespective of the steering of the driver. Although the equation for calculating the steering shaft reaction torque Ttran is different from the corresponding equation in the first embodiments the mechanical configurations are different, the steering shaft reaction torque may be obtained either by detection with a sensor or by calculation according to Equation (16), as described in the first to sixth embodiments.

The technique described in the first to sixth embodiments can be used, as it is, as a technique for calculating road surface reaction torque Ttire_est after obtaining steering shaft reaction torque Ttran.

The eighth embodiment can provide the same advantages as the first to sixth embodiments do even in the steer-by-wire-type electric power steering control apparatus. A road surface reaction torque estimation value can be used as a target value of the steering torque generation device of the steer-by-wire apparatus in which the steering wheel 1 and the tires 2 are not connected to each other mechanically.

As described above, even in the steer-by-wire-type configuration, the eighth embodiment makes it possible to estimate road surface reaction torque by detecting steering shaft reaction torque even if the steering speed or the vehicle speed varies.

What is claimed is:

1. An electric power steering control apparatus having an electric motor device that applies assist torque for assisting steering torque of a driver to a steering shaft that is coupled to an axle of a vehicle, comprising:

vehicle speed detecting means for detecting a vehicle speed;

motor speed detecting means for detecting a rotation speed of the electric motor device;

steering shaft reaction torque signal outputting means for outputting a steering shaft reaction torque signal that corresponds to steering shaft reaction torque acting on the steering shaft; and road surface reaction torque detecting means for outputting a road surface reaction torque estimation value to be used for a control on the assist torque by filtering the steering shaft reaction torque signal by a low-pass filter operation, wherein a time constant of the low-pass filter operation is determined in according with the vehicle speed detected by the vehicle speed detecting means and the motor rotation speed detected by the motor speed detecting means.

2. The electric power steering control apparatus according to claim 1, wherein the steering shaft reaction torque signal outputting means is a detecting means for outputting the steering shaft reaction torque signal depending on the steering shaft reaction torque.

3. The electric power steering control apparatus according to claim 1, wherein the steering shaft reaction torque signal outputting means is a calculating means for calculating the steering shaft reaction torque signal on the basis of a steering torque detection signal depending on the steering torque, a motor current detection signal depending on a motor current of the electric motor device and a motor rotation acceleration signal depending on a rotation acceleration of the electric motor device.

4. The electric power steering control apparatus according to claim 1, wherein the time constant rest of the low-pass filtering operation is determined according to an equation $$\tau est = (Ggear \times Tfric + Tfrp)/(Kalign \times \omega s)$$

where Ggear is a gear ratio of reduction gears for transmitting the assist torque from the electric motor to the steering shaft, Tfric is steady-state friction torque of the electric motor, and Tfrp is friction torque in a steering mechanism, Kalign is a ratio of road surface reaction torque that depends on the vehicle speed to a steering angle, and $\omega s$ is a steering speed that is obtained from the motor rotation speed.

5. The electric power steering control apparatus according to claim 1, wherein the steering shaft reaction torque signal that is filtered by the low-pass filter operation includes a term that is a product of a steering shaft rotation acceleration and a proportional gain.

6. The electric power steering control apparatus according to claim 1, wherein the time constant of the low-pass filter operation has an upper limit and a lower limit.

7. The electric power steering control apparatus according to claim 1, wherein the time constant of the low-pass filter operation has an upper limit and a lower limit that depend on the vehicle speed.

8. The electric power steering control apparatus according to claim 1, wherein a steering wheel for driving the vehicle and the axle are connected to each other via the steering shaft and the electric motor is coupled to the steering shaft via reduction gears.

9. The electric power steering control apparatus according to claim 1, wherein the electric power steering control apparatus has a steering-angle-superimposition configuration in which the electric motor device includes a first electric motor and a second electric motor, the first electric motor controls gear output torque that is the steering torque of the driver multiplied by a variable gear ratio, and the second electric motor applies assist torque for controlling an actual steering angle to the steering shaft in accordance with the gear output torque.

10. The electric power steering control apparatus according to claim 9, wherein a steering wheel for driving the vehicle and the axle are connected to each other via the steering shaft, the first electric motor is coupled to the steering shaft via reduction gears, and the second electric motor is coupled to the steering shaft via planetary gears.

11. The electric power steering control apparatus according to claim 1, wherein the electric power steering control apparatus has a steer-by-wire configuration in which the electric motor device includes a first electric motor and a second electric motor, there is no mechanical link between a steering wheel for driving the vehicle and the axle, the first electric motor controls steering reaction torque that is transmitted to the steering wheel, and the second electric motor applies assist torque for controlling an actual steering angle of the axle to the steering shaft.

12. The electric power steering control apparatus according to claim 11, wherein the road surface reaction torque estimation value obtained by the road surface reaction torque detecting means is used for the steering reaction torque control and the actual steering angle control.

* * * * *